US007991636B1

(12) United States Patent
Groves

(10) Patent No.: US 7,991,636 B1
(45) Date of Patent: Aug. 2, 2011

(54) BUDDY LIST-BASED CALENDARING

(75) Inventor: Blake Groves, Austin, TX (US)

(73) Assignee: AOL Inc., Dulles, VA (US)

( * ) Notice: Subject to any disclaimer, the term of this patent is extended or adjusted under 35 U.S.C. 154(b) by 2210 days.

(21) Appl. No.: 10/822,732

(22) Filed: Apr. 13, 2004

Related U.S. Application Data

(60) Provisional application No. 60/543,392, filed on Feb. 11, 2004.

(51) Int. Cl.
*G06Q 10/00* (2006.01)
(52) U.S. Cl. .................................................. 705/7.18
(58) Field of Classification Search .............. 705/8, 7.18
See application file for complete search history.

(56) References Cited

U.S. PATENT DOCUMENTS

| | | | |
|---|---|---|---|
| 5,625,377 A | 4/1997 | Jenson | |
| 6,677,968 B1* | 1/2004 | Appelman | 715/853 |
| 7,080,139 B1* | 7/2006 | Briggs et al. | 709/224 |
| 7,383,308 B1* | 6/2008 | Groves et al. | 709/206 |
| 7,461,378 B2* | 12/2008 | Beyda | 719/313 |
| 7,516,161 B1* | 4/2009 | Flam | 1/1 |
| 7,549,054 B2* | 6/2009 | Brodie et al. | 713/182 |
| 2003/0105820 A1* | 6/2003 | Haims et al. | 709/205 |
| 2003/0149606 A1* | 8/2003 | Cragun et al. | 705/8 |
| 2003/0233265 A1* | 12/2003 | Lee et al. | 705/8 |
| 2004/0073615 A1* | 4/2004 | Darling | 709/206 |
| 2004/0133638 A1* | 7/2004 | Doss et al. | 709/203 |
| 2004/0172455 A1* | 9/2004 | Green et al. | 709/207 |
| 2004/0203901 A1* | 10/2004 | Wilson et al. | 455/456.1 |
| 2004/0261013 A1* | 12/2004 | Wynn et al. | 715/511 |
| 2005/0018826 A1* | 1/2005 | Benco et al. | 379/202.01 |
| 2005/0050151 A1* | 3/2005 | Mitchell et al. | 709/207 |
| 2005/0120306 A1* | 6/2005 | Klassen et al. | 715/765 |
| 2005/0125737 A1* | 6/2005 | Allen et al. | 715/758 |
| 2005/0163289 A1* | 7/2005 | Caspi et al. | 379/88.13 |
| 2006/0059024 A1* | 3/2006 | Bailey et al. | 705/5 |
| 2007/0002825 A1* | 1/2007 | O'Brien et al. | 370/351 |
| 2007/0168447 A1* | 7/2007 | Chen et al. | 709/207 |

FOREIGN PATENT DOCUMENTS

KR 2008049289 * 11/2006

OTHER PUBLICATIONS

Dwight Silverman. (Mar. 26, 1996). Titles abound, Apple wants you to know :[1,7,8 Edition]. The San Diego Union—Tribune,p. 12. Retrieved Aug. 18, 2009, from ProQuest Newsstand. (Document ID: 1242700951).*

(Continued)

*Primary Examiner* — Andre Boyce
*Assistant Examiner* — Folashade Anderson
(74) *Attorney, Agent, or Firm* — Finnegan, Henderson, Farabow, Garrett & Dunner, LLP

(57) ABSTRACT

Instant messaging (IM) entities may be invited to an electronic calendar event using an instant message. Selecting the IM entities as invitees to the event may include dragging and dropping names of the IM entities from a buddy list of an IM application to an event from an electronic calendar application, or vice versa. A method of inviting an entity to a calendar event includes providing a calendar event from a calendar application and recognizing, by the calendar application, an IM entity as an invitee to the event.

55 Claims, 24 Drawing Sheets

OTHER PUBLICATIONS

Business/Technology Editors. (Jan. 19). YouthStream's Breakthrough Multimedia Instant Messenger is Now Available at mybytes.com. Business Wire,1. Retrieved Aug. 18, 2009, from Business Dateline. (Document ID: 48084685).*

RD346101, Jan. 1993, Research Disclo.*

InfoAdvantage your go-to IT pros (Jul. 2003). Sametime 3.0: Instant Messaging for Your Business aproduct review, www.infoad.com.*

Lotus Sametime Standard 8 (2008) Quick Guide for Users, www.wareSource.com.*

Saffari, Kay (Jul. 2002) A Preview of Sametime 3.0, http://www.ibm.com/developerworks/lotus/library/ls-preyST3_0/index.html.*

Business Editors and High-Tech Writers. (Apr. 21). Tribal Voice Teams with CommTouch Software to Combine Instant Messaging and Free Web-Based PowWow Mail. Business Wire,1. Retrieved Nov. 11, 2010, from Business Dateline. (Document ID: 40722152).*

Ed Stansel, Tech Talk editor. (Sep. 14, 1997). Free ICQ program lets computer users keep track of friends online :[City Edition]. Florida Times Union,p. D.3. Retrieved Nov. 11, 2010, from Business Dateline. (Document ID: 14446102).*

Outlook 2000 Tips and Tricks; Kyle Hommes; "Use Outlook to Track Long-Distance Calls"; reprinted from http://www.microsoft.com/office/previous/2000/tips/outlook.asp printed on Feb. 2, 2004 (17 pages).

* cited by examiner

BUDDY LIST-BASED CALENDARING

CROSS REFERENCE TO RELATED APPLICATIONS

This application claims the benefit of U.S. Provisional Application No. 60/543,392, filed Feb. 11, 2004, and titled "Buddy List-based Calendaring", which is incorporated by reference in its entirety.

TECHNICAL FIELD

This document relates generally to electronic calendar events and certain implementations relate more particularly to inviting an entity to a calendar event using electronic messages.

BACKGROUND

Scheduling an electronic calendar event may involve proposing a specific date and time to one or more potential event participants (i.e., inviting), and modifying the date and time of the event based on the availability of those participants. The participants typically communicate to determine a time when they are available to attend the event. Electronic mail ("e-mail") may be the communication medium used to schedule such an event.

SUMMARY

In one general aspect, a method for extending electronic invitations to a calendar event includes recognizing selection of at least one time parameter for an event. Access to a buddy list user interface that makes perceivable user-identified online identities and real time presence information for at least some of those online identities is enabled. Selection of participants to whom invitations will be extended for the calendar event from among the online identities included in the buddy list user interface is received. Invitations to be communicated to the selected participants are generated, and at least one of the invitations is extended by sending an instant messaging communication.

In another general aspect, a computer system capable of extending electronic invitations to a calendar event includes a recognition module configured to recognize selection of at least one time parameter for an event and an access module configured to enable access to a buddy list user interface that makes perceivable user-identified online identities and real time presence information for at least some of those online identities. The computer system also includes a selection module configured to receive selection of participants to whom invitations will be extended for the calendar event from among the online identities included in the buddy list user interface. The computer system also includes an invitation module configured to generate invitations to be communicated to the selected participants and a communications module configured to extend at least one of the invitations by sending an instant messaging communication.

In another general aspect, an apparatus for extending electronic invitations to a calendar event includes recognition means for recognizing selection of at least one time parameter for an event and access means for enabling access to a buddy list user interface that makes perceivable user-identified online identities and real time presence information for at least some of those online identities. The apparatus also includes selection means for receiving selection of participants to whom invitations will be extended for the calendar event from among the online identities included in the buddy list user interface. The apparatus also includes invitation means for generating invitations to be communicated to the selected participants and communications means for extending at least one of the invitations by sending an instant messaging communication.

Implementations may include one or more of the following features. For example, which of the selected participants are presently online may be determined, and the invitations may be extended by sending instant messaging communications to the selected participants who are presently online.

The invitations extended to the online participants via instant messaging all may be sent at the same time.

The invitations extended to multiple of the online participants via instant messaging may be displayed to the invitor in a unified user interface. The invitations extended to multiple of the online participants via instant messaging may be displayed to the invitor using a command line user interface that includes a single window listing communications from each of the multiple online participants.

Which of the selected participants are presently online may be determined, and an instant messaging chat may be established among available participants to negotiate availability for participation in the calendar event.

That a selected participant is presently offline may be determined, and an invitation may be extended to the selected participant who is determined to be presently offline using a communications program other than instant messaging. Electronic mail may be the communications program used to extend the invitation to the selected participant who is presently offline.

Which of the selected participants are presently online may be determined. Instant messages may be used to extend invitations to the selected participants who are presently online, and electronic mail may be used to extend invitations to the selected participants who are presently offline.

That a selected participant is presently offline may be detected, and the user may be provided with options to extend electronic invitations to offline participants an invitation using a communications program other than instant messaging. Electronic mail may be the communications program used to extend the invitation to the selected participant who is not presently online.

That a selected participant is not presently online may be detected, and an invitation may be extended to the selected participant using an instant message whose delivery will be delayed until the selected participant is again online.

The presence information reflected for an online identity by the user-defined list may reflect an availability of that online identity to receive instant messaging communications without delay.

At least one participant selection may be received in response to a user dragging a calendar event from a calendar application user interface to a position on a buddy list user interface corresponding to the participant. At least one participant selection may be received in response to a user dragging a time block from a calendar application user interface to a position on a buddy list user interface corresponding to the participant, and the at least one time parameter for the event may be recognized by providing a calendar event input interface listing the participant as an invitee in response to the dragging of the time block.

At least one participant selection may be received in response to a user dragging a calendar event from a calendar application user interface to a position on a buddy list user interface corresponding to the participant. At least one participant selection may be received in response to a user dragging a representation of an online identity from within their buddy list to a calendar application user interface. Selection of multiple participants may be received in response to a user dragging a representation of a group of multiple online identities from within their buddy list to a calendar application user interface.

In another general aspect, a method of using a calendar interface to invite an entity to a calendar event includes enabling user generation of a calendar event to which at least a first invitee and a second invitee are invited using an instant messaging system. User selection of a first instant messaging entity as the first invitee and a second instant messaging entity as the second invitee is recognized. A single message including an invitation to the calendar event to the first instant messaging entity and the second instant messaging entity is generated, and the user is enabled to send the message as an instant message that is sent concurrently to the first instant messaging entity and the second instant messaging entity using the instant messaging system.

Implementations may include one or more of the following features. For example, a response to the message may be received from the first instant messaging entity that is not sent to the second instant messaging entity or from the second instant messaging entity that is not sent to the first instant messaging entity.

An invitation to the calendar event for the first invitee and the second invitee may be generated by a calendar application.

The message may be the invitation to the calendar event. Enabling the user to send the message may include enabling the user to send the invitation from a calendar application to an instant messaging server. Enabling the user to send the message may include enabling the user to send the invitation to a communications application, and allowing the communications application to deliver the invitation to the first instant messaging entity and the second instant messaging entity. The communications application may be an instant messaging application.

The first instant messaging entity and the second instant messaging entity may be automatically invited to the calendar event using instant messages in response to recognizing the first instant messaging entity and the second instant messaging entity as invitees. Automatically inviting may include sending the invitation to the calendar event to the first instant messaging entity and the second instant messaging entity using instant messages.

Recognizing the first instant messaging entity and the second instant messaging entity as invitees may be performed in response to a user dragging the calendar event from a calendar application to a representation of the first instant messaging entity and a representation of the second instant messaging entity. Recognizing the first instant messaging entity and the second instant messaging entity as invitees may be performed in response to a user entering the first instant messaging entity and the second instant messaging entity into the calendar event. Recognizing the first instant messaging entity and the second instant messaging entity as invitees may be performed in response to a user selecting the first instant messaging entity and the second instant messaging entity from a list of potential instant messaging entities, the list being generated by a calendar application.

Recognizing the first instant messaging entity and the second instant messaging entity as invitees may be performed in response to a user dragging and dropping a block of time from a calendar application to a representation of the first instant messaging entity and a representation of the second instant messaging entity. Enabling user generation of a calendar event may include providing a calendar application, in which the user may generate the calendar event, the calendar event being provided in response to the dragging and dropping, with the first instant messaging entity and the second instant messaging entity as invitees.

Recognizing the first instant messaging entity and the second instant messaging entity as invitees may be performed in response to a user selecting a feature associated with the first instant messaging entity and the second instant messaging entity, the feature automatically inviting the first instant messaging entity and the second instant messaging entity to the calendar event. Recognizing the first instant messaging entity and the second instant messaging entity may occur before enabling user generation of the electronic content.

Recognizing the first instant messaging entity and the second instant messaging entity may be performed in response to the user dragging a representation of the first instant messaging entity and a representation of the second instant messaging entity to a representation of the electronic content. Recognizing the first instant messaging entity and the second instant messaging entity may be performed in response to the user dragging a representation of the electronic content to a representation of the first instant messaging entity and a representation of the second instant messaging entity.

The first instant messaging entity or the second instant messaging entity may represent an individual user of an instant messaging system. The first instant messaging entity or the second instant messaging entity may represent multiple users of an instant messaging system. The first instant messaging entity or the second instant messaging entity may be listed in a buddy list. The message may be an instant message that may be sent to multiple instant messaging entities at substantially the same time.

The electronic content may be modified as indicated in the response to produce modified electronic content. A new message including the modified electronic content may be generated, the new message being associated with the first instant messaging entity and the second instant messaging entity. The user may be enabled to send the new message as an instant message to the first instant messaging entity and the second instant messaging entity using the instant messaging system.

In another general aspect, a method of sharing electronic content includes enabling access to user designation of contacts for whom presence is maintained. User selection of one or more of the contacts is enabled, and user selection of a first contact and a second contact from the contacts is recognized. A calendar event invitation associated electronically with the first contact and the second contact as recipients is accessed, and the calendar event invitation is sent to each of the first contact and the second contact using an instant messaging system.

Implementations may include one or more of the following features. For example, sending the electronic message may be in response to a single user instruction. Enabling access, enabling user selection, recognizing user selection, accessing the electronic message, and sending the electronic message may be each performed by an instant messaging application.

In another general aspect, an apparatus includes a computer readable medium having instructions stored thereon that when executed by a machine result in at least enabling user generation of electronic content by an application, the electronic content to be shared with at least a first recipient and a second recipient using an instant messaging system. User selection of a first instant messaging entity as the first recipient and a second instant messaging entity as the second recipient is recognized by the application. A message including the electronic content is generated, the message being associated with the first instant messaging entity and the second instant messaging entity. The user is enabled to send the message as an instant message to the first instant messaging entity and the second instant messaging entity using the application.

In yet another general aspect, an apparatus comprising a computer readable medium having instructions stored thereon that when executed by a machine result in at least enabling user description of contacts for whom presence is maintained and enabling user selection of one or more of the contacts. User selection of a first contact and a second contact from the contacts is recognized. An electronic message associated electronically with the first contact and the second contact areas recipients is accessed, and the electronic message is sent to each of the first contact and the second contact using an instant messaging system.

In yet another general aspect, a method of inviting an entity to a calendar event includes providing a calendar event from a calendar application and recognizing, by the calendar application, an instant messaging entity as an invitee to the calendar event.

In yet another general aspect, a method of selecting an invitee to a calendar event includes selecting a calendar event maintained by a calendar application and selecting an instant messaging entity as an invitee to the calendar event.

In yet another general aspect, a method for scheduling a calendar event includes providing a calendar event within a calendar application and maintaining a list of invitees within an instant messaging application. One or more invitees from the list of invitees are recognized as invitees in response to a user dragging a representation of the calendar event from the calendar application to a representation of the one or more invitees. An invitation to the calendar event is generated. The invitation to the calendar event is sent in instant messages to the one or more invitees. Proposed changes to the calendar event are received from the one or more invitees in response to receiving the invitation. Approval of the proposed changes to the calendar event is received. The calendar event is modified to create an updated calendar event that reflects the proposed changes. An updated invitation to the updated calendar event is generated. The updated invitation to the updated calendar event is sent in instant messages to the one or more invitees, and confirmation of attendance to the updated calendar event is received from the one or more invitees.

In yet another general aspect, a method of scheduling a calendar event includes providing a calendar event within a calendar application and maintaining a list of invitees within an instant messaging application. One or more invitees from the list of invitees are recognized as invitees in response to a user dragging a representation of the one or more invitees to a representation of the calendar event from the calendar application. An invitation to the calendar event is generated, and the invitation to the calendar event is sent in instant messages to the one or more invitees. Proposed changes to the calendar event are received from the one or more invitees in response to receiving the invitation. Approval of the proposed changes to the calendar event is received. The calendar event is modified to create an updated calendar event that reflects the proposed changes. An updated invitation to the updated calendar event is generated. The updated invitation to the updated calendar event is sent in instant messages to the one or more invitees, and confirmation of attendance to the updated calendar event is received from the one or more invitees.

The details of one or more implementations are set forth in the accompanying drawings and the description below. Other features will be apparent from the description and drawings, and from the claims.

DETAILED DESCRIPTION

Figure 1:
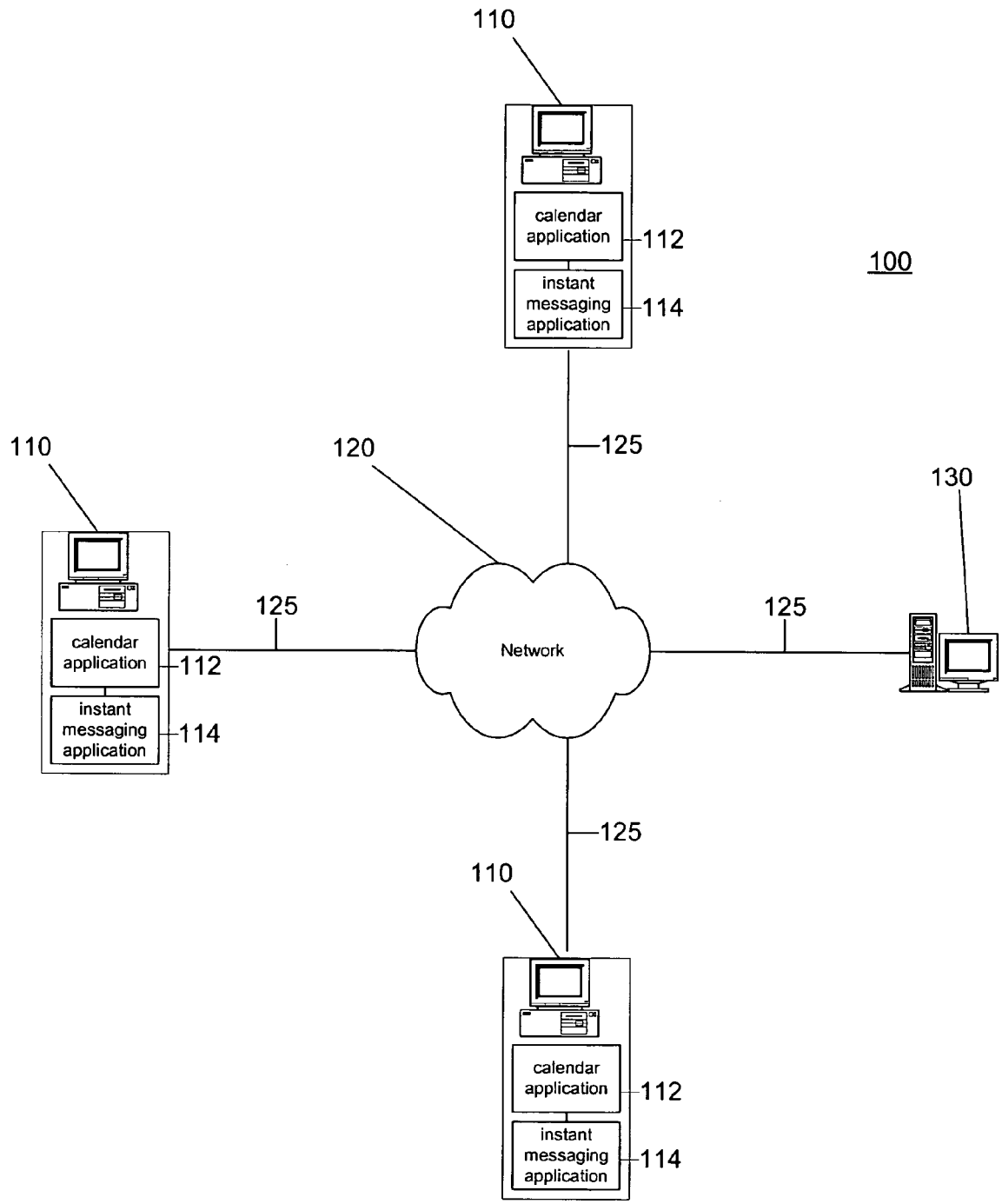
FIG. 1 is a block diagram of an exemplary electronic communication system.

Scheduling an event may demand the attention of all the people that are to attend the event. Each person that is to attend the event may need to determine his or her availability to attend the event and, if necessary, determine and communicate changes that need to be made to the event such that attendance is possible. Various types of communication may be used to invite the proposed attendees (i.e., the invitees) to the event, including e-mail. Another type of communication that may be used is an instant messaging (IM) system. The instant messaging system may automatically display the invitation on the screens of the invitees, immediately bringing the invitation to the attention of the invitees. Use of an IM system may allow an invitor to receive prompt responses to their invitation, while providing some level of assurance to the invitor that the invitee perceives their invitation without undue delay.

One implementation involves scheduling an event among a set of people using a combination of a calendar application and an IM system. The calendar application enables the storage, creation, and modification of events that a person is scheduled to attend. The calendar application also displays pending but unconfirmed events for review. The IM system may be used to send invitations to a proposed event, to suggest changes to the proposed event, and to inform invitees to the proposed event of changes to the proposed event.

In the above implementation, the person that originally proposed the event may have the names of one or more invitees stored in a buddy list, and thus may leverage the buddy list in selecting invitees and invoking calendar invitations. For example, the person originally scheduling the event may drag and drop a representation of a calendar event from the calendar application over a name or group of names in the buddy list, such that identification and contact information for the buddy list invitees may be added to or referenced by the calendar event and an instant message and/or e-mail message invitation or an alert may be inspired from the invitor to the invitee(s). Similarly, a name or group of names from the buddy list may be dragged and dropped over a representation of a calendar event from the calendar application. As another example, a blank period of time from the calendar application also may be dragged and dropped over a name or group of names in the buddy list to select the name or group of names as invitees to an unspecified event that will occur during the blank period of time. Likewise, a name or group of names from the buddy list also may be dragged and dropped over a blank period of time to create a new event during the blank period of time with the name or group of names as invitees to the event. As yet another example, the names of the people to be invited to the event may be typed or chosen from a list in the calendar application.

More particularly, in the above implementation, after the particular users of the IM system have been selected as invitees to the event, an invitation is sent to the selected users. The invitation may include a description of the event with a proposed time and date for the event. The communication of this invitation may be used to inspire creation of a corresponding calendar event entry in the calendar application for each of the invitees and to inspire an alert regarding conflicting calendar entries for the invitee.

An invitee may suggest a change to the proposed event, for example, when a conflict exists between the proposed event and another event stored within the calendar application for the invitee. The invitation to the proposed event may include a form that the invitees may use to request changes in the proposed event, and the form may propagate to the other invitees. Such requested changes may be approved by the user that originally proposed the event before they are propagated to the invitees. Once propagated, changes to the event may be automatically entered into the calendar application for all the invitees, and/or notifications may be sent to each invitee of proposed changes to enable their confirmation of availability/acceptance or alternatively their proposal for further modification to the event.

By receiving invitations over the IM system, the invitees may be notified without delay of invitations, enabling them to respond immediately. Moreover, invitees may promptly communicate and resolve conflicts.

Furthermore, by sending invitations over the IM system, the invitor may provide notification of an event without delay. Thus, invitors are provided a convenient, simple, and quick manner to inspire creation of an event with selected invitee(s), as well as a convenient manner of selecting the invitees. For example, to inspire creation of an event, an invitor may conveniently copy a selected time slot(s) and paste using a command, such as, for example, <control><c>, the copied time slot(s) to one or more buddies, or other contacts. Invitee(s) may be selected, for example, by pasting the copied time slot on a buddy (or other invitee), by preselecting one or more buddies using, for example, a left-click on a mouse for a single buddy or <shift> click for multiple buddies and pasting the copied time slot(s) onto the selected buddy(ies). Dragging and dropping also may be used in lieu of, or in addition to copying and pasting. Dragging a time slot or event over a buddy also may automatically select (e.g., highlight) that buddy. Invitees may be selected for an existing calendar event in an analogous manner to selecting invitees to a newly inspired event, for example, by copying/pasting or dragging/dropping the existing event.

As suggested above, enabling selection of the invitees and the event itself quickly by dragging and dropping between an electronic calendar and a buddy list may save time in creating/updating an event. Dragging and dropping may automatically specify certain details of the event, eliminating the need to enter those details, and thereby saving time. For example, simply dragging a time slot to a group of buddies (or other contacts) automatically specified the time, day, duration, and multiple invitees for an event.

Referring to FIG. 1, an implementation of a networked computing environment 100 supports communications between computer users. The networked computing environment 100 facilitates communication for scheduling an event among multiple users of the networked computing environment 100. The networked computing environment 100 is used to distribute messages that aid in the scheduling and modification of the event.

Users of the networked computing environment 100 are distributed geographically and communicate using client systems 110. The client systems 110 are shown including a calendar application 112 and an IM application 114, although other client systems that do not include applications 112 or 114 may be used. A network 120 interconnects the client systems 110. The client systems 110 are connected to network 120 through various communication media 125, such as a modem connected to a telephone line (using, for example, serial line interne protocol (SLIP) or point-to-point protocol (PPP)) or a direct network connection (using, for example, transmission control protocol/internet protocol (TCP/IP)). A host server 130 also may be connected to the network 120 and may be used to facilitate some direct or indirect communications between the client systems 110.

Each of the client systems 110 may operate the calendar application 112 that enables a user to schedule events for attendance by multiple users of the networked computing environment 100. The client system 110 also may operate the IM 114 application that allows a user of the client system 110 to communicate with the other users of the networked computing environment 100. Each instance of the IM application 114 may have an associated buddy list that includes the users of the IM system that may be invited to an event. A user of the IM application 114 may create a calendar event using the calendar application 112 and then invite other users to the event using the IM application 114. The calendar application 112 may facilitate specification of the details of the event, such as a date and a time for the event, while the IM application 114 may facilitate selection of a set of users to be invited to the event and invitation of the users to the event.

Figure 2:
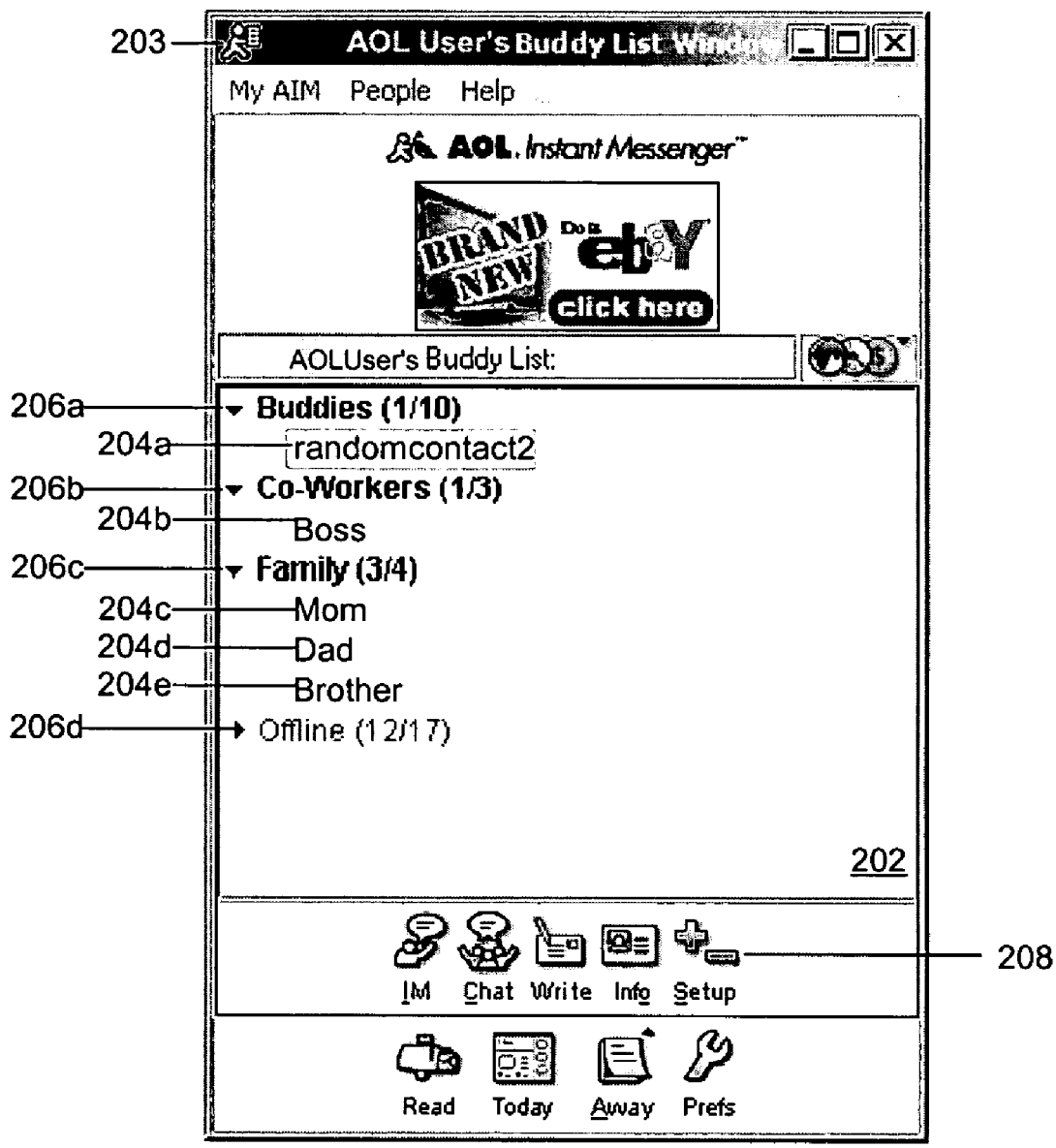
FIG. 2 is an illustration of an exemplary interface for displaying a buddy list for an instant messaging system.

Referring to FIG. 2, one implementation of a buddy list interface 200 may be used with one or more of the systems described herein to display, for a given user, identifiers (e.g., screen names) for other users whom they have selected for presence monitoring. The other users that have been selected for presence monitoring are logically grouped to form a buddy list for the given user. The buddy list interface 200 enables designation by the given user of others to invite to the proposed calendar event through selection of their identifiers or screen names using the given user's buddy list.

The buddy list interface 200 contains a text box 202 that contains the buddy list for the given user, who is identified in the title bar 203 by a screen name "AOL User." The buddy list includes multiple screen names. The buddy list in the buddy list interface 200 includes the screen name 204a, "random-contact2"; the screen name 204b, "Boss"; the screen name 204c, "Mom"; the screen name 204d, "Dad"; and the screen name 204e, "Brother."

The buddy list in the buddy list interface 200 separates the constituent screen names 204a-204e into multiple buddy groups 206a-d. Specifically, the buddy list includes a buddy group 206a, "Buddies"; a buddy group 206b, "Co-Workers";

a buddy group 206c, "Family"; and a buddy group 206d, "Offline," that includes the screen names in the buddy list that are not connected to the IM system at any given instant in time. The screen name 204a appears below the heading for the buddy group 206a because the screen name 204a has been placed in the buddy group 206a and the corresponding user (randomcontact2) is logged in to the IM system. The heading for each of the buddy groups 206a-d indicates the total number of buddies in the group, as well as the number of buddies who are included in the group who presently are logged into the IM system-those who are "present." For example, one out of the ten members of the buddy group 206a is logged in to the IM system. The buddy list interface 200 contains a "Setup" button 208 that, when selected, enables the user to modify screen names included within the displayed buddy list.

Figure 3:
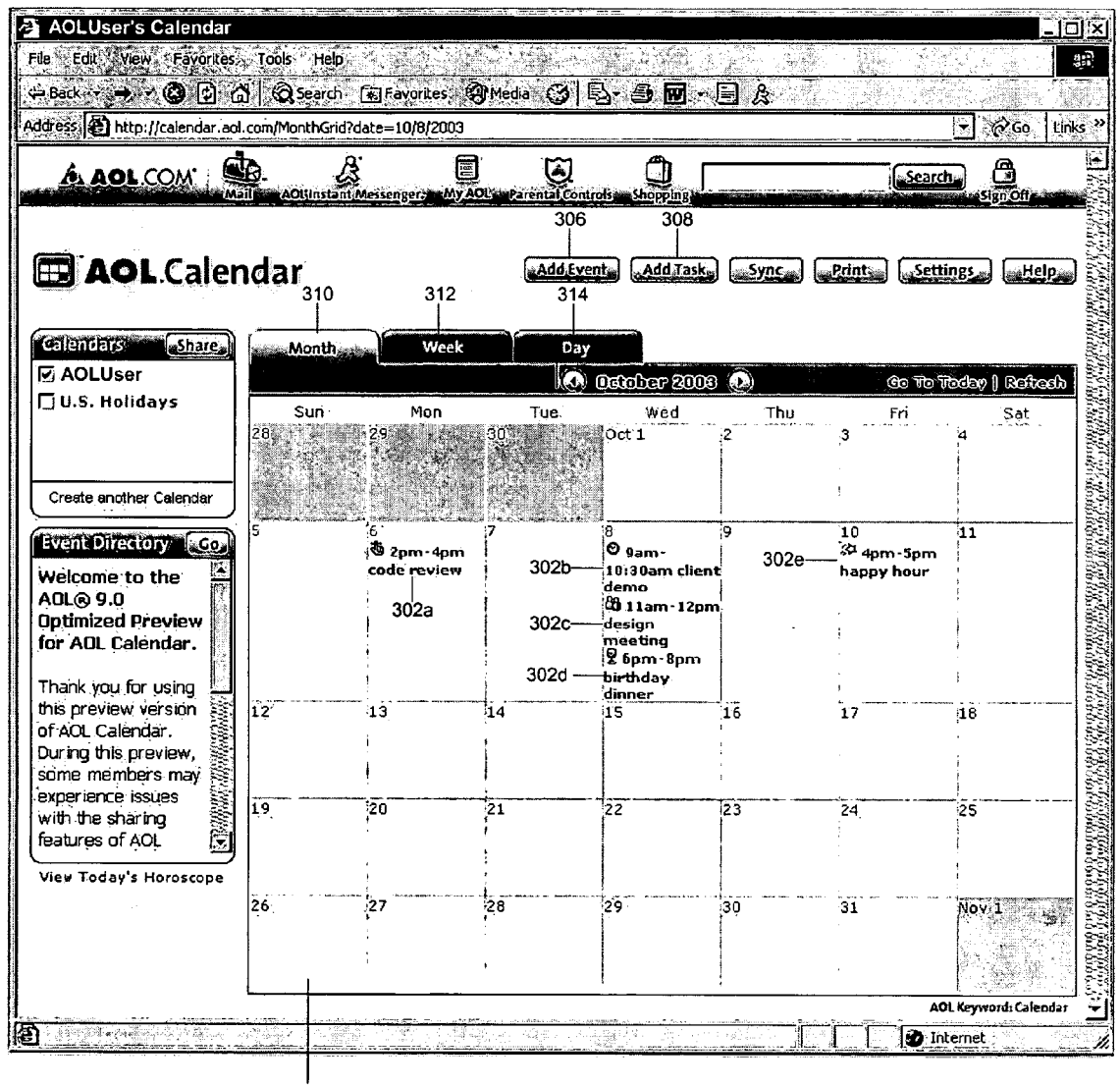
FIGS. 3-5 are illustrations of exemplary interfaces for displaying events in a calendar application by month, day, and week, respectively.

Referring to FIG. 3, one implementation of an electronic calendar interface 300 for use with one or more of the systems described herein displays electronic calendar events from a calendar of a given user for a selected month. The electronic calendar interface 300 includes multiple events 302a-e scheduled occur during the displayed month. For example, the electronic calendar interface 300 displays an event 302a titled "code review," an event 302b titled "client demo," an event 302c titled "design meeting," an event 302d titled "birthday dinner," and an event 302e titled "happy hour." The location of each of the events 302a-e within the electronic calendar interface 300 indicates the day on which the event 302a-e occurs. For example, the event 302a occurs on the sixth day of the displayed month. The electronic calendar interface 300 also includes blank periods 304a during which no events are scheduled. The blank periods 304a represent a full day during which no events occur.

Events may be added to the month currently displayed by the electronic calendar interface 300 through the use of an interface displayed as a result of selecting an "Add Event" button 306 or an "Add Task" 308. Selecting the "Add Event" button 306 causes an interface to be displayed for specifying an event that is to be added to the user's calendar. Selecting the "Add Task" button 308 causes an interface to be displayed for specifying a particular type of event, that is, a task, that is to be added to the user's calendar.

The electronic calendar interface 300 also includes tabs 310-314 that may be used to select the desired view. A month tab 310 has been selected, as evidenced by the highlighted appearance of the tab, so the events occurring during a single month are displayed. Selecting a week tab 312 causes the electronic calendar interface 300 to display only the events occurring during a selected week, as described with reference to FIG. 4. Similarly, selecting a day tab 314 causes the electronic calendar interface 300 to display only the events occurring on a selected day, as described with reference to FIG. 5.

Figure 4:
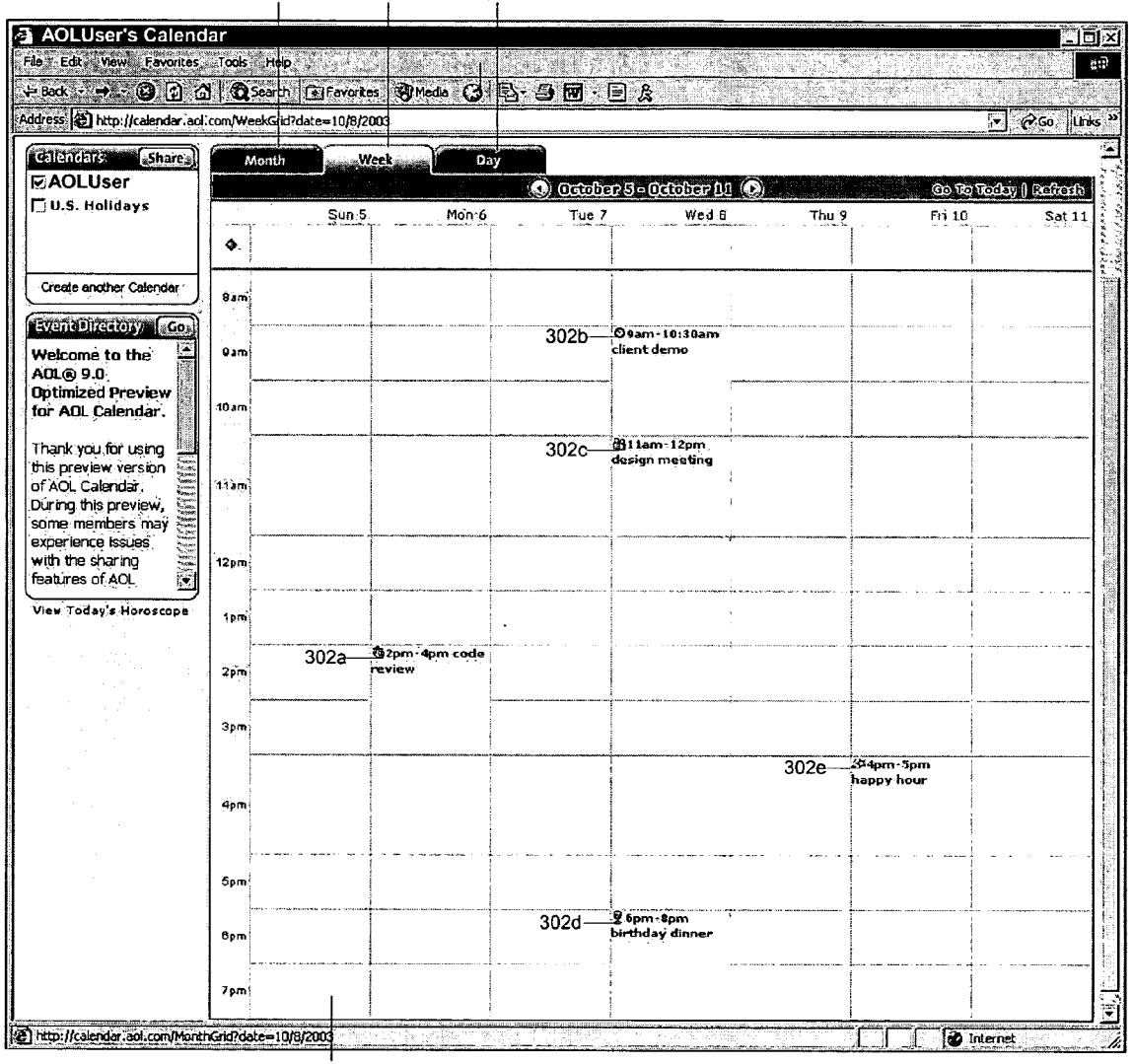

Referring to FIG. 4, the week tab 312 on the electronic calendar interface 300 has been selected, as evidenced by the highlighted appearance of the tab 312. Consequently, the events that occur during a selected week are displayed in FIG. 4. Because the week of Oct. 5, 2003 is selected for presentation in the "week" view of FIG. 4, and because the events 302a-e occur during the week of Oct. 5, 2003, the events 302a-e are displayed on the electronic calendar interface 300. The location and size of each of the events 302a-e within the electronic calendar interface 300 indicate the date, time, and duration of the event. For example, the event 302e occurs on the tenth day of the month, which is a Friday, from 4 PM to 5 PM. The electronic calendar interface 300 also includes blank periods 304b during which no events are scheduled. The blank periods 304b represent hours within the displayed week during which no events are scheduled to occur. The tabs 310-314 remain available to specify the desired view.

Figure 5:
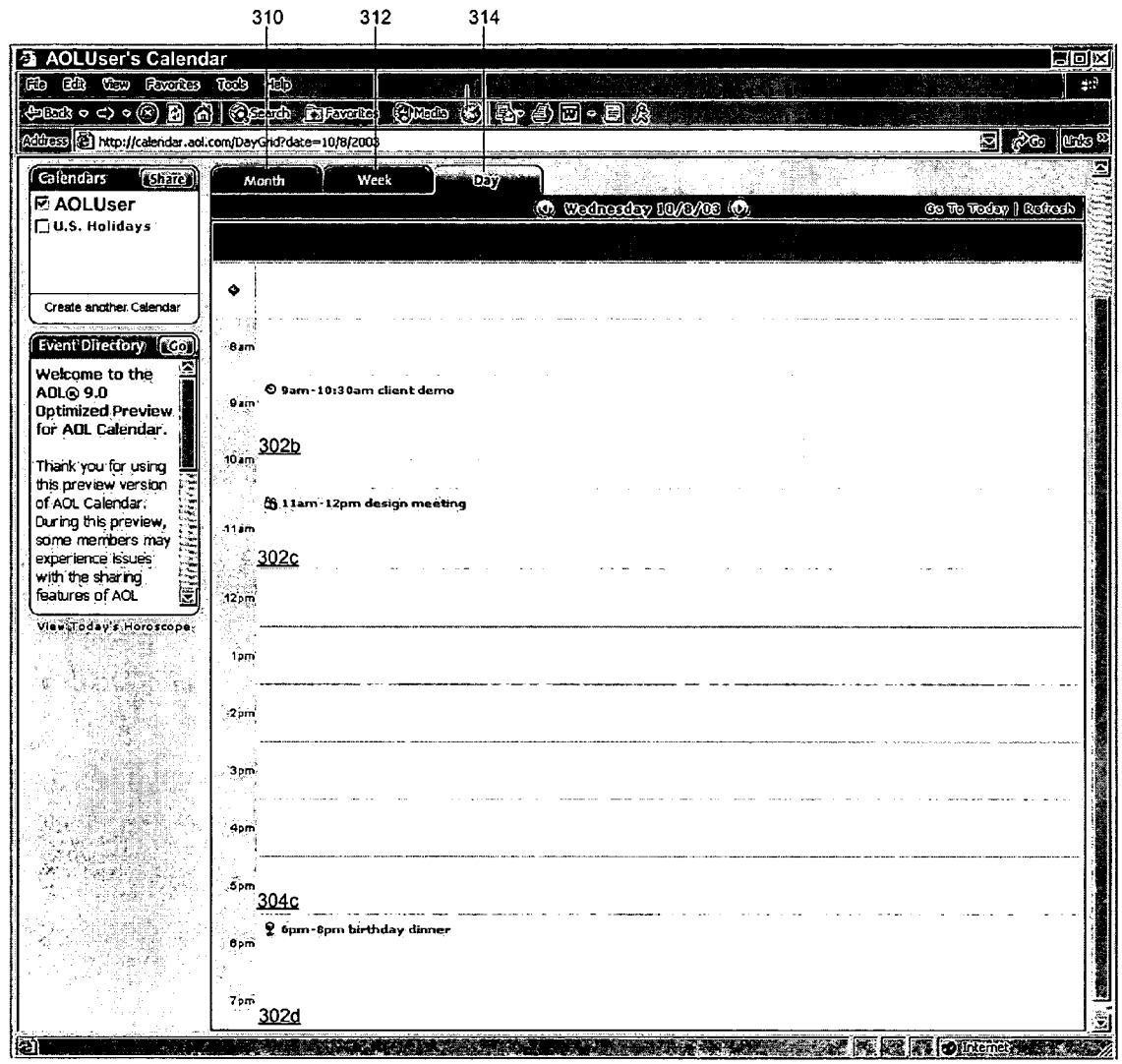

Referring to FIG. 5, the day tab 314 on the electronic calendar interface 300 has been selected, as evidenced by the highlighted appearance of the tab 314. Consequently, the events that occur during a selected day are displayed in FIG. 5. Because the day of Oct. 8, 2003 is selected for presentation in the "day" view of FIG. 5, and because the events 302b-d occur during the day of Oct. 8, 2003, the events 302b-d are displayed on the electronic calendar interface 300. The location and size of each of the events 302b-d within the electronic calendar interface indicate the time and duration of the event. For example, the event 302d occurs between 6 PM and 8 PM on the displayed day. The electronic calendar interface 300 also includes blank periods 304c during which no events are scheduled. The blank periods 304c represent hours within the displayed day during which no events are scheduled to occur. The tabs 310-314 remain available to specify the desired view.

Figure 6:
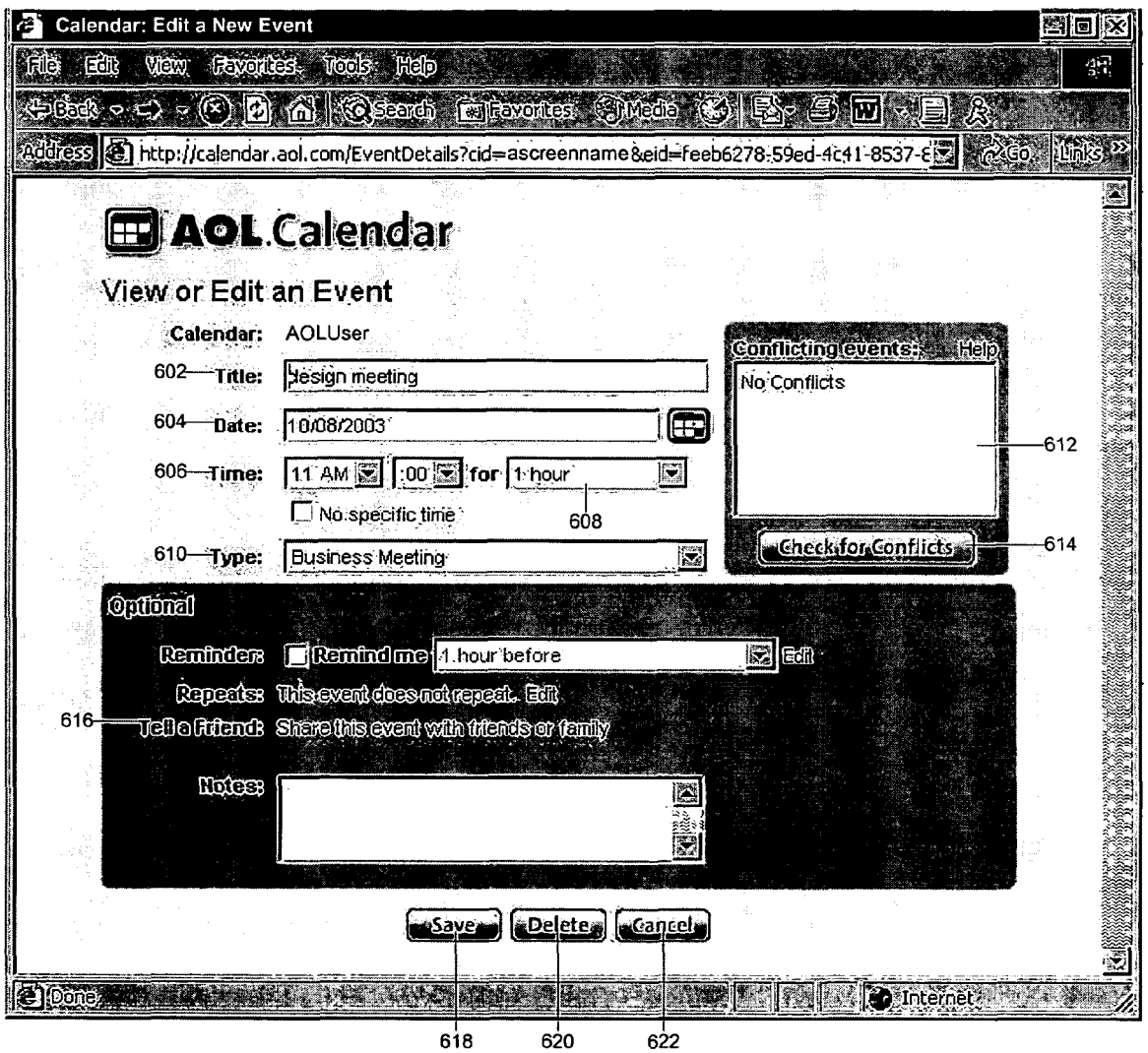
FIG. 6 is an illustration of an exemplary interface for modifying an event in a calendar application.

Referring to FIG. 6, one implementation of the electronic calendar interface 300 for use with one or more of the systems described herein includes an event specification tool 600 that enables the specification of new events to be added to the calendar. The event specification tool 600 is displayed after the "Add Event" button 306 or the "Add Task" button 308 from FIG. 3 is selected. A descriptive title for the new event may be entered into a title text field 602, and a date for the new event may be specified in a date text field 604. Time selection boxes 606 may be used to select the time of the event, and a duration selection box 608 may be used to specify the length of the event. A type for the new event may be chosen from a type selection box 610. For example, an event may be categorized as an appointment, a business meeting, a lunch, a personal meeting, or some other category, including both standard categories provided by a calendar system and user-defined categories.

In one implementation, conflicts between the new event and events already existing in the calendar may be displayed on the events specification tool 600 in a conflicts text box 612. The conflicts text box 612 will list events in the calendar that conflict with the new event, and the list may be produced by selecting a conflict check button 614. If no events in the calendar conflict with the new event, then the conflicts text box 612 may include the text "No Conflicts." The details of the new event specified in text boxes 602 and 604 and selection boxes 606-610 may be changed to eliminate one or more conflicts listed in the conflicts text box 612.

In another implementation, other people may be invited to the new event. Selecting a sharing link 616 may display a tool (see FIG. 7) for choosing the people that are to be invited to the new event.

In another implementation, the event specification tool 600 also enables the modification of existing events. The tool 600 may be presented for an existing event with the details of the existing event already specified.

Any changes made to the details of a new event or an existing event may be saved by selecting a save button 618. An existing event also may be deleted from the calendar through use of a delete button 620. Any changes made to the details of a new event or an existing event may be undone and discarded by selecting a cancel button 622.

Figure 7:
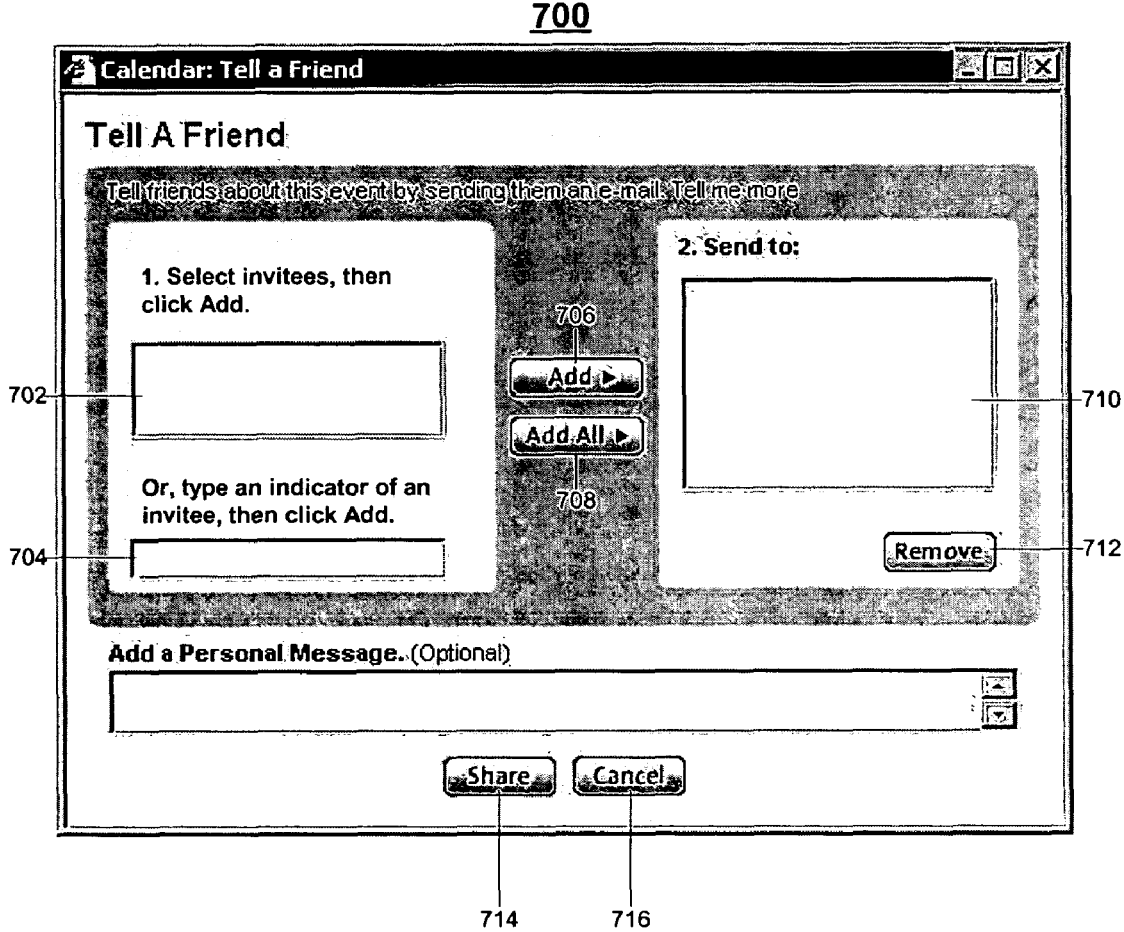
FIG. 7 is an illustration of an exemplary interface for specifying the invitees to an event in a calendar application.

Referring to FIG. 7, an implementation of the electronic calendar interface 300 also may include a mechanism for specifying the people to be invited to an event. An invitation tool 700 for specifying invitees to an event may be displayed after the sharing link 616 from FIG. 6 is selected from the event specification tool 600 for an event. Invitees to the event may be chosen from a possible invitee list 702 that may include all possible invitees to the event. The names of invitees also may be entered manually into an invitee text box 704.

In one implementation, selecting an add button 706 after one or more invitees have been selected from the possible invitee list 702 or entered into the invitee text box 704 adds the selected or entered names to the set of people that are to be invited to the event for which the invitation tool 700 was displayed. Alternatively or additionally, all names included in the possible invitee list 702 may be added to the set of invited people by selecting an "Add All" button 708.

In another implementation, the names of the people added to the set of people to be invited may be listed in a selected invitee list 710. Invitees may be removed from the selected invitee list, and additionally or consequently from the set of people to be invited to the event, by selecting a remove button 712.

An invitation may be sent to each of the people with names listed in the selected invitee list 710 by selecting a share button 714. Any changes made to the set of people to be invited may be undone and discarded through use of a cancel button 716.

Figure 8:
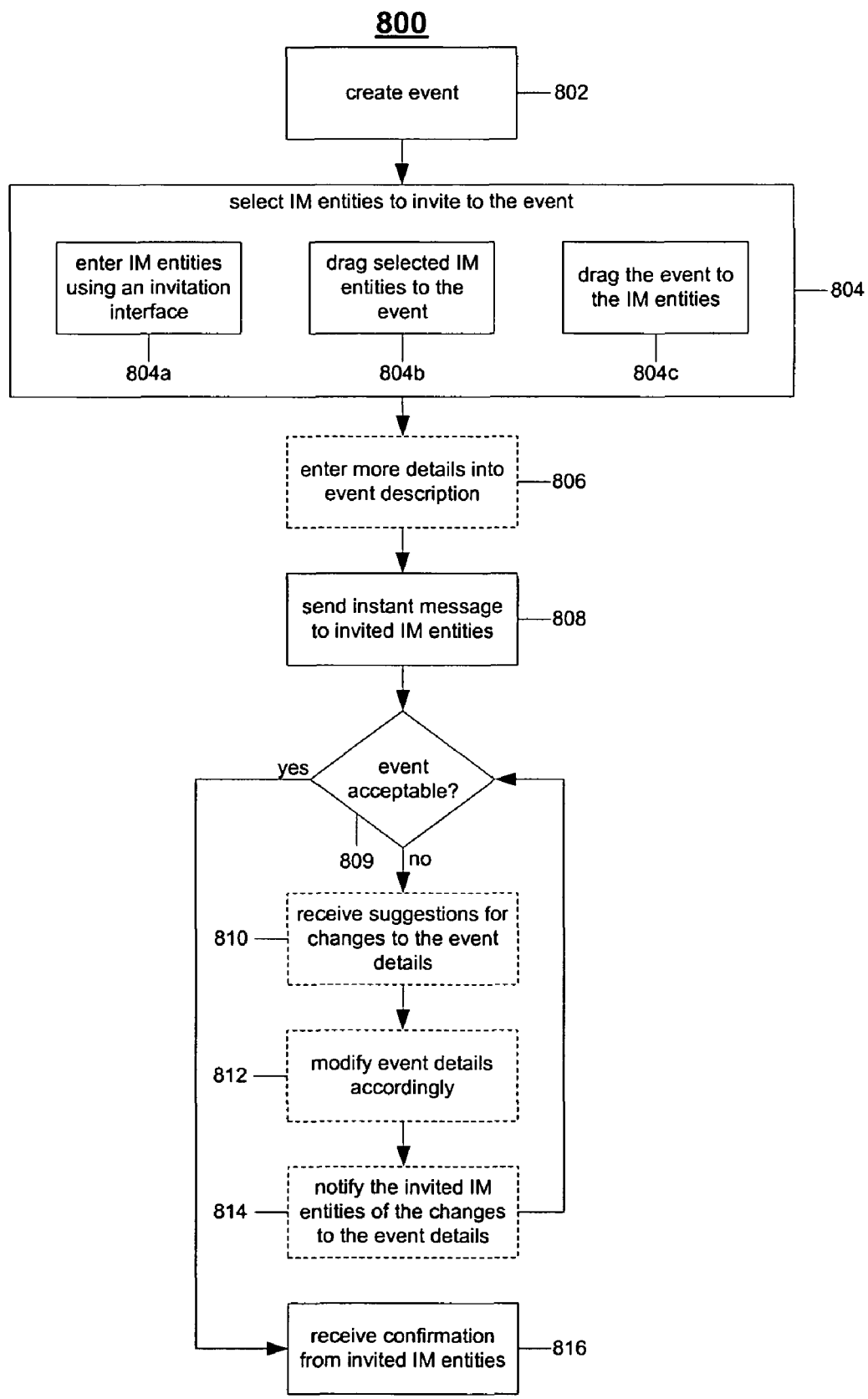
FIG. 8 is a flow chart of an exemplary process allowing a user to invite invitees to a specified electronic calendar event.

Referring to FIG. 8, a process 800 allows a user to invite invitees to an event. The process 800 may involve use of one or more of the buddy list interface 200 from FIG. 2, the electronic calendar interface 300 from FIGS. 3-5, and the associated tools 600 and 700 from FIGS. 6 and 7. For example, the process 800 may be used to invite people listed on the buddy list interface 200 to an event created within the electronic calendar interface 300.

The process 800 includes creating an event using, for example, the event specification tool 600 (802). Creating the event may include, for example, providing information for one or more of the boxes 602-610. The process 800 also includes selecting FM entities to invite to the event (804). IM entities may include, for example, (i) individuals, such as, for example, individual buddies, (ii) groups of individuals, such as, for example, a buddy group, or (iii) organizations, where each IM entity has an IM screen name or other IM account identifier.

IM entities may be selected (804) in various ways. For example, the invitor may use an invitation interface to enter IM entities to be invited to the event (804*a*). An invitation interface may be, for example, the invitation tool 700, and in one implementation of the process 800, the invitor may select the sharing link 616 in conjunction with (before, during, or after) creating the event (802). Upon selecting the sharing link 616, the invitation tool 700 is displayed and IM entities may be selected or entered, for example, in one or more of the invitee lists, as explained in the discussion of the invitation tool 700.

As another example of selecting IM entities (804), the invitor may select IM entities in various ways and drag the selected IM entities to the event to which the selected IM entities are to be invited (804*b*). In one implementation of the process 800, the IM entities are selected from a buddy list included in the buddy list interface 200. The selected entities may be dragged from the buddy list interface to a representation of the event included, for example, in at least one of the month, the week, or the day views of the electronic calendar interface 300. The representation of the event also may be a free-standing icon, for example. The action of dragging the IM entities to the event, or dragging and dropping, selects the IM entities as invitees to the event.

As yet another example of selecting IM entities (804), the invitor may select and drag the event to the IM entities to be invited to the event (804*c*). In one implementation of the process 800, a representation of the event is included in at least one of the month, the week, or the day views of the electronic calendar interface 300. The event is dragged from the electronic calendar interface 300 to the names of the IM entities to be invited to the event included in the buddy list interface 200. The action of dragging the event to the IM entities, or dragging and dropping, selects the IM entities as invitees to the event.

After IM entities have been selected as invitees to the event (804), other details of the event optionally may be specified (806). For example, one or more of the fields in the event specification tool 600 may not have been filled-in or may need to be modified. After the event creator is satisfied with the event, an invitation to the event is sent to the selected IM entities (808). The invitation is in the form, for example, of an instant message. If an IM entity is not available to receive an instant message, then an e-mail message, or some other form of communication, may be sent automatically to the IM entity. The instant message may include, for example, a description of the proposed event and a link that, when selected, causes the event to be added to the calendar of the IM entity that received the invitation. The instant message also may include a form with which changes to the details specifying the event may be suggested and sent to the event creator and, optionally, other invitees. Changes may be suggested so as, for example, to avoid a conflict. In one implementation, the electronic calendar interface 300 is used to create an event, and the calendar application 112 sends the event to the IM application 114 for sending invitation IMs. The IM application 114 packages the information in an instant message to be sent to the IM entities. The packaging of the invitation IMs designates the IM as including an invitation to a calendar event and includes the event information in a specified format. Upon receipt of the invitation IM at another system, the IM application 114 on that other system recognizes the destination an inserts a link to a script or other routine for loading the event into the local calendar application 112. The packaging of the invitation IMs also includes a form that can be used to suggest changes. The form may be preloaded with the event information and may be opened within the IM application 114 or the calendar application 112 on that other system, or using some other application. The form also includes a mechanism for sending the form back to the invitor.

The invitation is received by an invited IM entity and a determination is made as to whether the event is acceptable (809). The determination may be manual if, for example, the invited IM entity objects to the event, or the determination may be automatic if, for example, there is a time conflict. If the event is acceptable, the invited IM entity sends a confirmation, which the event creator receives (816). If the event is not acceptable, then the invited IM entity sends suggested changes. Any suggested changes sent to the event creator may be received in, for example, an instant message (810), and the event may be modified accordingly (812). An updated invitation may be sent to notify all of the invited IM entities of the changes that have been proposed to the event (814), and the invited IM entity again determines if the (now modified) event is acceptable (809). As described in the discussion of FIGS. 12A-12M, the invitation displayed for the IM entities may be updated each time a change to the proposed event is made and propagated. Further, if an invitee has already accepted an event before all changes have been made to the event, the invitee may be notified of the additional changes made since the invitee accepted the event.

When an invitee accepts the invitation to the event, a confirmation to the invitation is sent to the event creator. The event creator then receives one or more confirmations (816). In one implementation, instant messages including reminders of the event are sent as the time for the event approaches.

Figure 9:
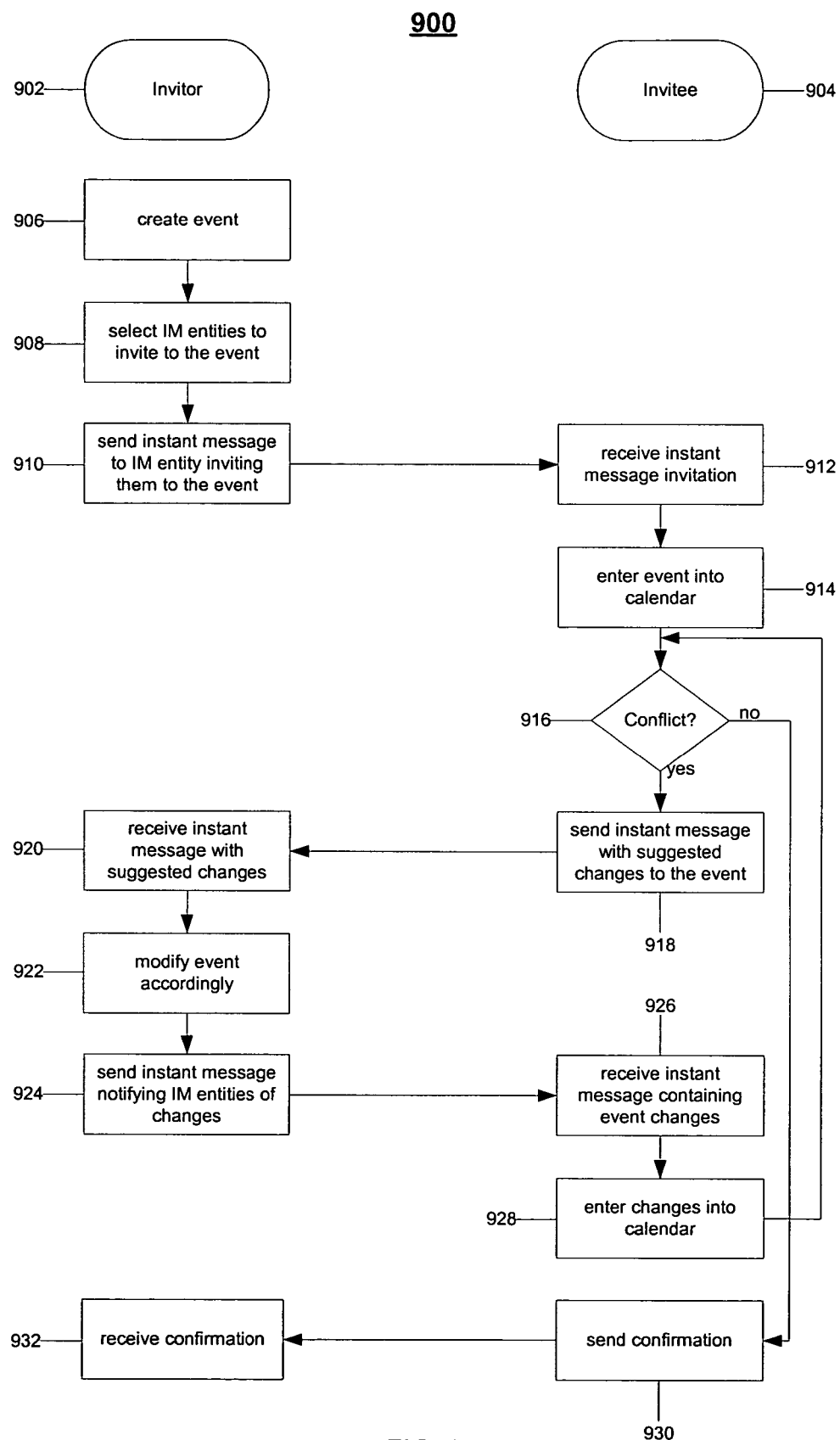
FIG. 9 is a flow chart of another exemplary process for allowing a user to invite invitees to a specified electronic calendar event.

Referring to FIG. 9, a scheduling process 900 may occur between an invitor 902 and an invitee 904 that is to be invited to an event created by the invitor 902. The process 900 begins when the invitor 902 creates an event within, for example, an electronic calendar application, using, for example, the electronic calendar interface 300 from FIGS. 3-5 (906). The invitor 902 then selects the IM entities to be invited to the event (908). An instant message is sent from the invitor 902 to the selected IM entities, including the invitee 904, inviting the selected IM entities to the event (910). If the invitee 904 is not able to receive an instant message from the invitor 902, then an e-mail message, or other form of communication, may be sent from the invitee 904 to the invitor 902.

The invitor 902 knows when the invitee 904 is unable to receive an instant message from the invitor 902 based on a lack of presence displayed for the invitee 904 in a buddy list associated with the invitor 902. For example, the name of the invitee 904 may be included in the offline buddy group 206d from FIG. 2. When it is determined that the invitee 904 is unavailable, the invitor 902 may manually create and send the e-mail message to the invitee 904. Additionally or alternatively, the e-mail message may be created and sent automatically when the name of the invitee 904 is found in the offline buddy group 206d based on an e-mail address that has been associated with the name of the invitee 904.

In another implementation, if the invitee 904 is unable to receive an instant message from the invitor 902, then an instant message including the invitation may be placed in a queue of instant messages to be sent to the invitee 904 when the invitee 904 becomes available to receive instant messages. For example, the instant messages may be sent to the invitee 904 as soon as the invitee 904 next logs in to the IM system. While the instant message remains in the queue of instant messages to be sent to the invitee 904, the invitor 902 may be presented with an indication that the invitation has not been seen or confirmed by the invitee 904.

The queue may be used to store instant messages sent to the invitee 904 while the invitee 904 is unable to receive the instant messages. For example, the queued instant messages may include invitations to calendar events that are proposed while the invitee 904 is unable to receive instant messages. The queue may be stored on a computer that the invitee 904 uses to access the LM system, such as the client system 110 of FIG. 1, or otherwise. The queue also may be stored on a server of the IM system that is accessed by the invitee 904, such as the host server 130 of FIG. 1. The server may store one queue for each user of the IM system.

The queue for the invitee 904 may be monitored to prevent, for example, burdening the invitee 904 with invitations to events that have already passed. For example, invitations to events that have already happened may be deleted from the queue periodically or in response to some event, such as the occurrence of an event for which an invitation has been placed in the queue. As another example, as an invitation is removed from the queue for delivery to the invitee 904, the date of the event for which the invitation is sent may be checked to confirm that the date has not already passed. If the date has not passed, then the invitation is delivered to the invitee 904, and if the date has passed, then the invitation is removed from the queue and not delivered to the invitee 904.

In yet another implementation, an e-mail message including an invitation to the event may be created and sent automatically to the invitee 904 and an alert of the e-mail message may be placed in a queue of instant messages to be sent to the invitee 904 when the invitee 904 next becomes available to receive instant messages. The queue in which the alert is placed may be the same queue in which other instant messages, including invitations to events, are queued for the invitee 904. When the invitee 904 is next available to receive instant messages, the invitee 904 is sent the alert. The alert may, for example, automatically take the invitee 904 to the e-mail message and enable the invitee 904 to accept or suggest changes to the proposed event, provide a link to the e-mail message, or merely alert the invitee 904 to the existence of the e-mail message. If the invitee 904 views the e-mail message before the alert is sent to and viewed by the invitee 904, then the alert is removed from the queue of instant messages. While the alert remains in the queue of instant messages to be sent to the invitee 904, the invitor 902 may be presented with an indication that the invitation has not been seen or confirmed.

By way of example, the invitor 902 may select five IM entities to be invited to the event. Of the five IM entities, two may be online and available to receive instant messages from the invitor 902. Those two IM entities, of which the invitee 904 is one, are sent invitations to the event in instant messages that are immediately received. The other three IM entities may not be available to receive instant messages. Of those three IM entities, one may have specified that instant message invitations to events be queued and delivered the next time the IM entity is available to receive instant messages, so an invitation is sent and queued for later delivery to the IM entity. The remaining two IM entities may have specified that e-mail invitations be sent when the IM entities are not available to receive instant messages and that instant messages alerts of the e-mail invitations be queued for delivery when each of the IM entities next becomes available to receive instant messages. As such, e-mail invitations are sent to and instant message alerts of the e-mail invitations are queued for the remaining two IM entities. One of the two IM entities receives the e-mail message before becoming available to receive instant messages, so the instant message alert is removed from the queue of instant messages for that IM entity. The other IM entity logs in to the IM system and receives the alert, which takes the IM entity to the e-mail invitation.

In instances where the invitee 904 is available to receive an instant message by the invitor 902, the invitee 904 receives the instant message sent by the invitor 902 (912). The invitee 904 enters the event described in the invitation into an electronic calendar application that stores events for the invitee 904 (914). A determination is made, either manually or by the electronic calendar application, as to whether the event to which the invitee 904 was just invited conflicts with other events stored by the electronic calendar application (916). If the event does create a conflict with the previously stored events, then the invitee 904 determines what changes need to be made to the event for the invitee 904 to attend. These changes are suggested to the invitor 902 in an instant message (918).

The suggested changes are received by the invitor 902 (920), and the invitor 902 modifies the event according to the suggested changes received from the invitee 904 (922). The invitor 902 sends a new instant message to the invited IM entities, including the invitee 904, notifying the invited IM entities of the changes that have been made to the event (924).

The new instant message outlining the changes is received by the invitee 904 (926). The invitee 904 modifies the event stored in the electronic calendar application (928). The modification may be made automatically or in response to the invitee 904 accepting the proposed changes. A determination is made again as to whether the event conflicts with events already stored by the electronic calendar application (916). If a conflict is found, then the process of modifying the event according to suggested changes is repeated. If no conflict is found (on this iteration through operation 916 or the earlier iteration), then the invitee 904 sends a confirmation to the invitor 902 (930), and the invitor 902 receives the confirmation (932).

When the invitee 904 is sent an invitation to the event in an e-mail message while Other invitees are sent the invitation in an instant message, the invitee 904 may participate in the process of updating the event in various ways. In one implementation, the other invitees may modify the event, and the invitee 904 may receive a second e-mail message outlining the changes made to the event after the changes are agreed upon by all of the invitees (912-932).

In another implementation, the invitee 904 may receive a new e-mail message after every change that is accepted or made by the invitor 902. Each e-mail message may include a single button that may be used to send a communication (likely an e-mail) to the invitor 902 and/or the entire group of invitees so that the invitee 904 may participate in the process of changing the event whenever the invitee 904 receives an invitation.

Figure 10:
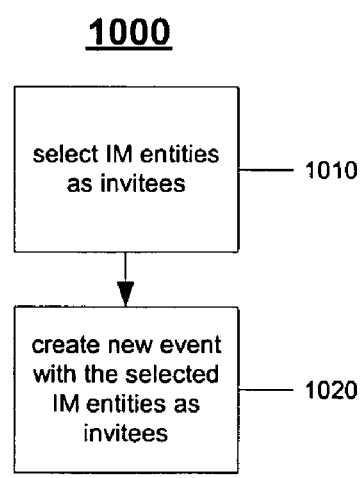
FIG. 10 is a flow chart of an exemplary process for inviting invitees to an unspecified electronic calendar event.

Referring to FIG. 10, a process 1000 may be used to specify the invitees to an event before details of the event itself are specified. In other words, the IM entities to be invited to the event may be selected before the event is created (1010). After the IM entities to be invited to the event have been chosen, the details of the event to which the IM entities are to be invited are specified (1020). Referring again to FIGS. 2-5, in one implementation of the process 1000, selection (1010) includes dragging and dropping a representation of a blank period of time in the electronic calendar interface 300 during which the proposed event is to occur over a screen name or group name (or a pre-selected set of names) from the buddy list interface 200. For example, the IM entity with the screen name 204a (FIG. 2) may be selected as an invitee to an event to occur during the blank period 304a (FIG. 3) by having both the buddy list interface 200 and the calendar interface 300 open on a desktop of a computer display, and dragging and dropping the blank period 304a over the screen name 204a. In other implementations the IM entities may be selected from a list or other interface, such as, for example, the invitation tool 700.

In further implementations, selection (1010) may include dragging and dropping, for example, a group name (or a pre-selected set of names) in the buddy list interface 200 over a representation of the blank period of time during which the proposed event is to occur from the electronic calendar interface 300. For example, the buddy group "Family" 206c may be selected as an invitee to an event to occur during the blank period 304a by dragging and dropping the buddy group "Family 206c over the blank period 304a.

Figure 11:
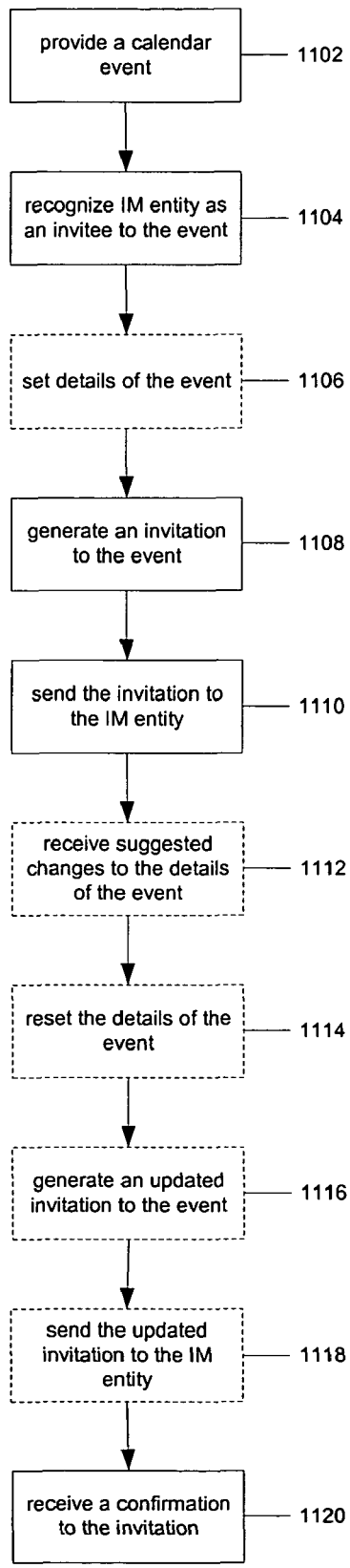
FIG. 11 is a flow chart of an exemplary process allowing a system to provide a user with collaborative scheduling of electronic calendar events.

Referring to FIG. 11, a process 1100 enables collaborative scheduling of electronic calendar events among a set of IM entities. The process 1100 enables, for example, implementations of the processes 800 and 900 from FIGS. 8 and 9. The process 1100 may be performed, for example, by a client system 110 or a host server 130, alone or in combination.

The process 1100 includes providing a calendar event from an electronic calendar application, such as, for example, the electronic calendar interface 300 (1102). The calendar event may be provided, for example, in response to a user request for creation of a new calendar event. An IM entity is recognized by the calendar application as an invitee to the event (1104). In one implementation, recognizing an IM entity as an invitee to the event includes recognizing when an existing event or a blank period in the calendar application has been dragged over the name of the IM entity. In another implementation, recognizing the IM entity as an invitee includes recognizing when the IM entity is selected from a list of IM entities. In a further implementation, recognizing the IM entity includes recognizing when the IM entity has been entered into an area for specifying invitees to the event. Note that several of these implementations reverse the order of operations 1102 and 1104 by using blank periods for which no event has yet been created.

If necessary, the details of the event are set in the calendar application to user specified values, possibly including default values (1106), and an invitation to the event is generated (1108). The invitation is sent to the IM entity (the invitee) using, for example, an instant message (1110). If the IM entity is not able to receive instant messages, then the invitation may be sent to the IM entity using an e-mail message or other form of communication. The IM entity may suggest changes to the details of the event due to conflicts, for example, between the event and other events of the IM entity, and the changes may be received (1112). The details of the event may be reset according to the suggested changes (1114), and an updated invitation to the event may be generated (1116). The updated invitation may be sent to the IM entity (1118). If the IM entity does not find any conflicts between the updated event and other events stored for the IM entity, then the IM entity sends a confirmation to the invitation, which is then received (1120). In one implementation, instant message reminders may be sent to the IM entity as the time of the event approaches.

As explained in more detail below, FIGS. 12A-12M illustrate operations that may be experienced in one implementation of the above concepts. The operations include inviting an invitee to a calendar event and receiving feedback from the invitee.

Figure 12A:
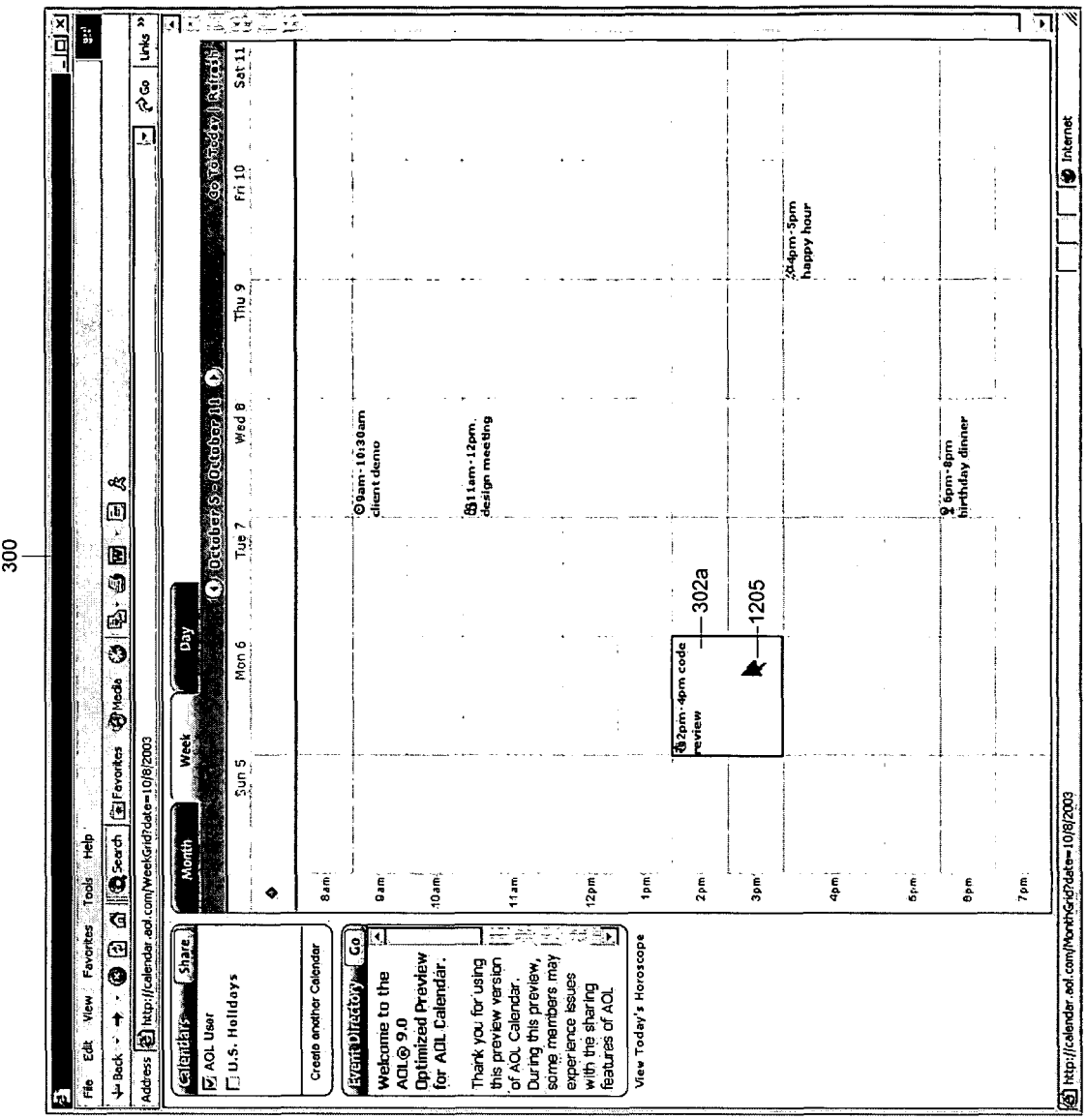
FIGS. 12A-12M are illustrations of exemplary interfaces displayed during collaborative scheduling of calendar events.
Figure 12A:
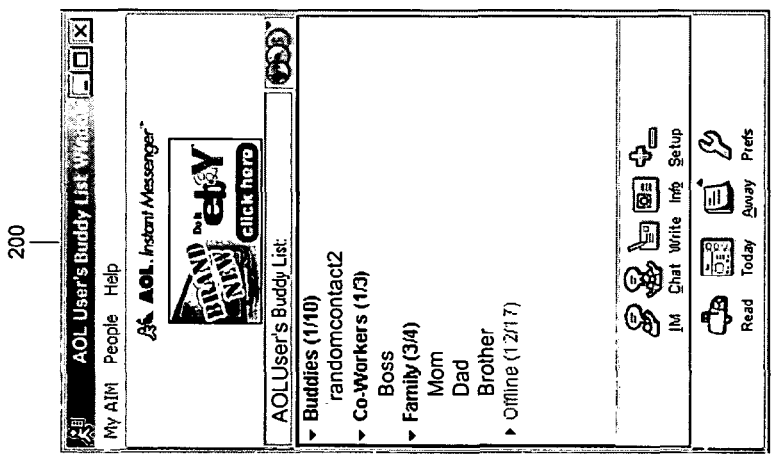

Referring to FIG. 12A, while collaboratively scheduling calendar events, a user with a screen name AOL User interacts with the buddy list interface 200 and the electronic calendar interface 300. The buddy list interface 200 and the electronic calendar interface 300 may be displayed such that the user sees both the buddy list interface 200 and the electronic calendar interface 300 at the same time. One or more screen names may be selected in the buddy list interface 200, although none is shown as being selected in the buddy list 200 of FIG. 12A. The electronic calendar interface 300 may include one or more calendar events. For example, the calendar interface 300 includes a calendar event 302a. As indicated by the bold outline around the calendar event 302a, the calendar event 302a has been selected. A mouse pointer 1205 may be used to select the calendar event 302a, or a screen name.

Figure 12B:
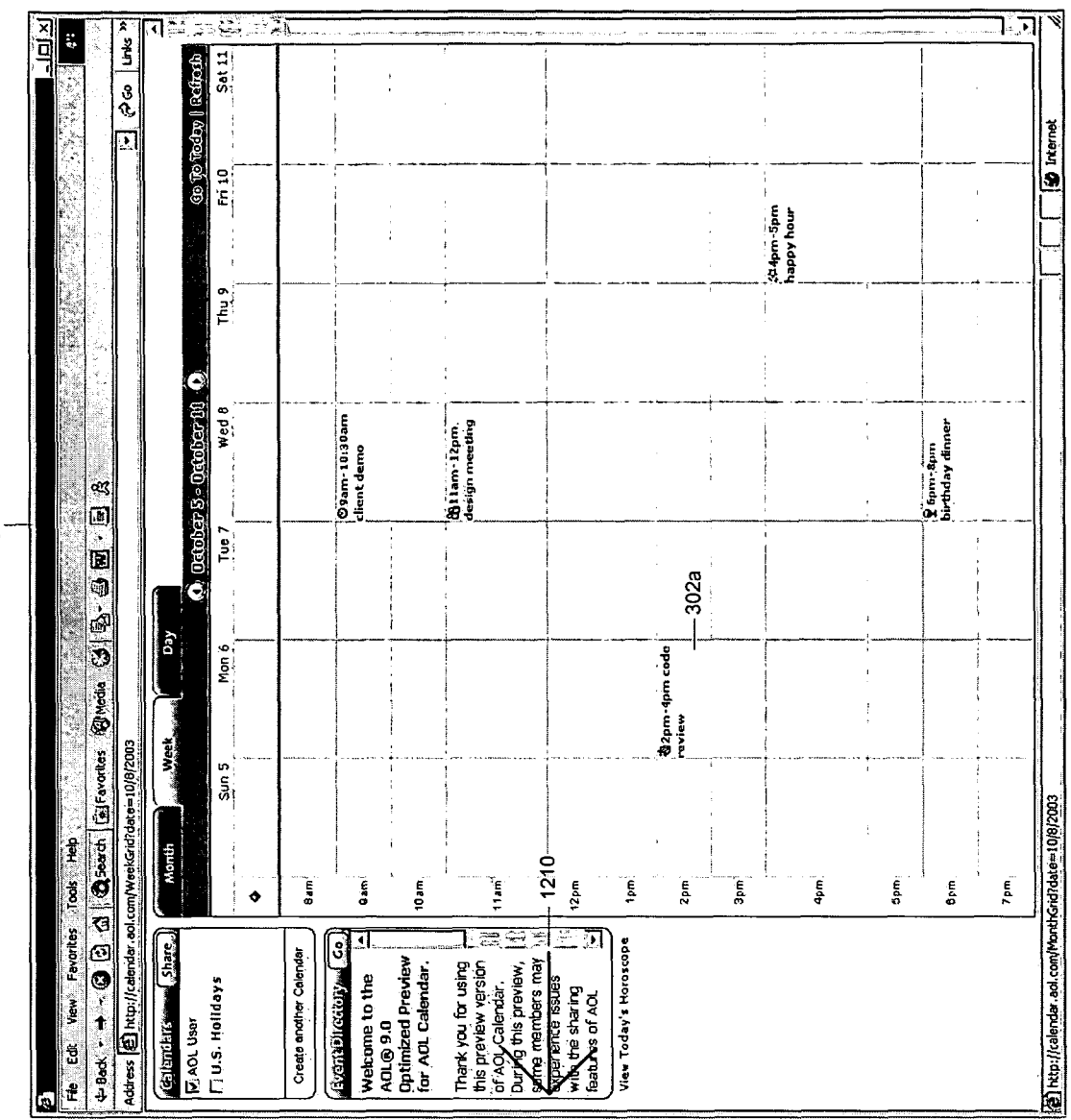
Figure 12B:
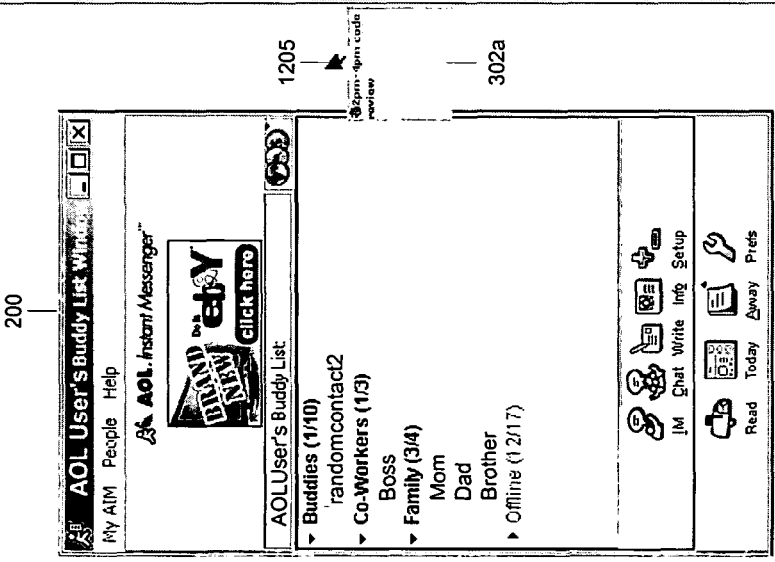
Figure 12C:
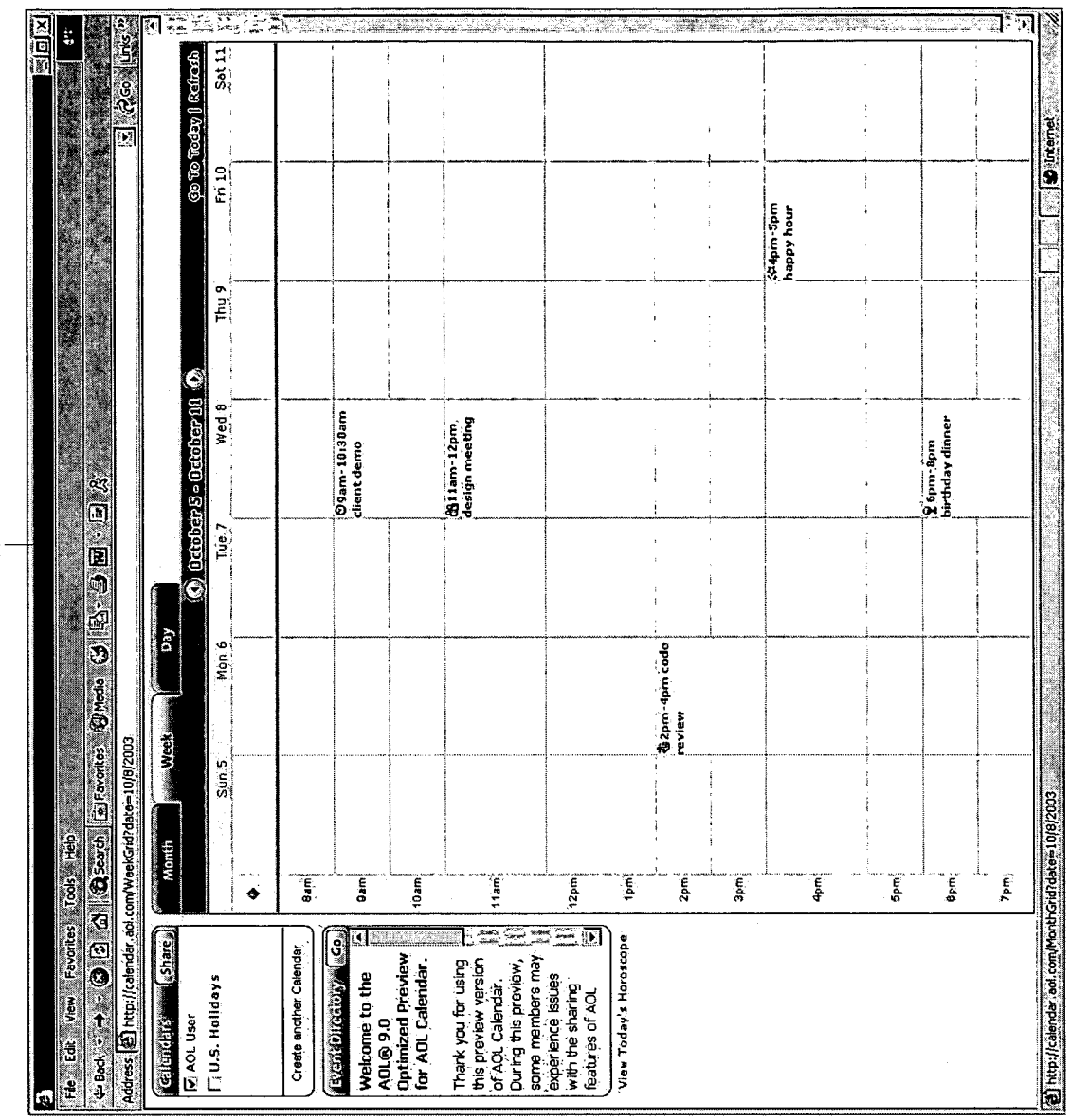
Figure 12C:
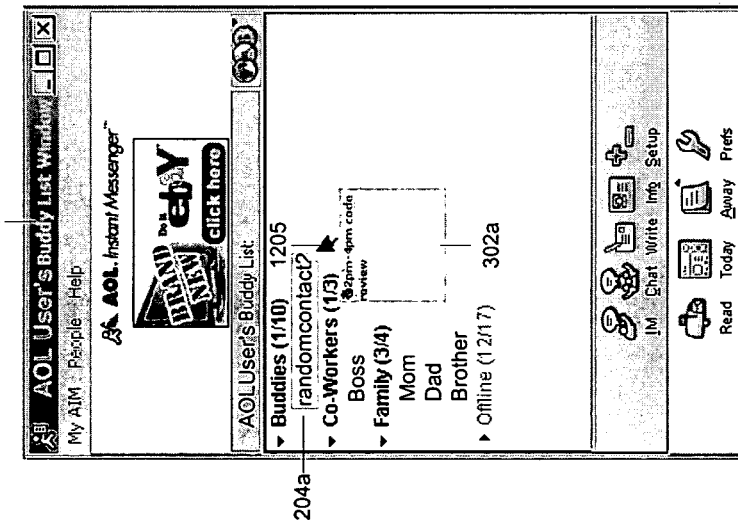

Referring to FIG. 12B, the event 302a has been selected from the electronic calendar interface 300 and is being dragged with the mouse pointer 1205. As indicated by an arrow 1210, the event 302a is being dragged towards the buddy list interface 200. Referring to FIG. 12C, the event 302a has been dragged from the electronic calendar interface 300 over the screen name 204a, "randomcontact2," in the buddy list interface 200, thereby selecting the screen name 204a as an invitee to the calendar event 302a. The selection of screen name 204a is shown by the highlighting of the screen name 204a in FIG. 12C.

Figure 12D:
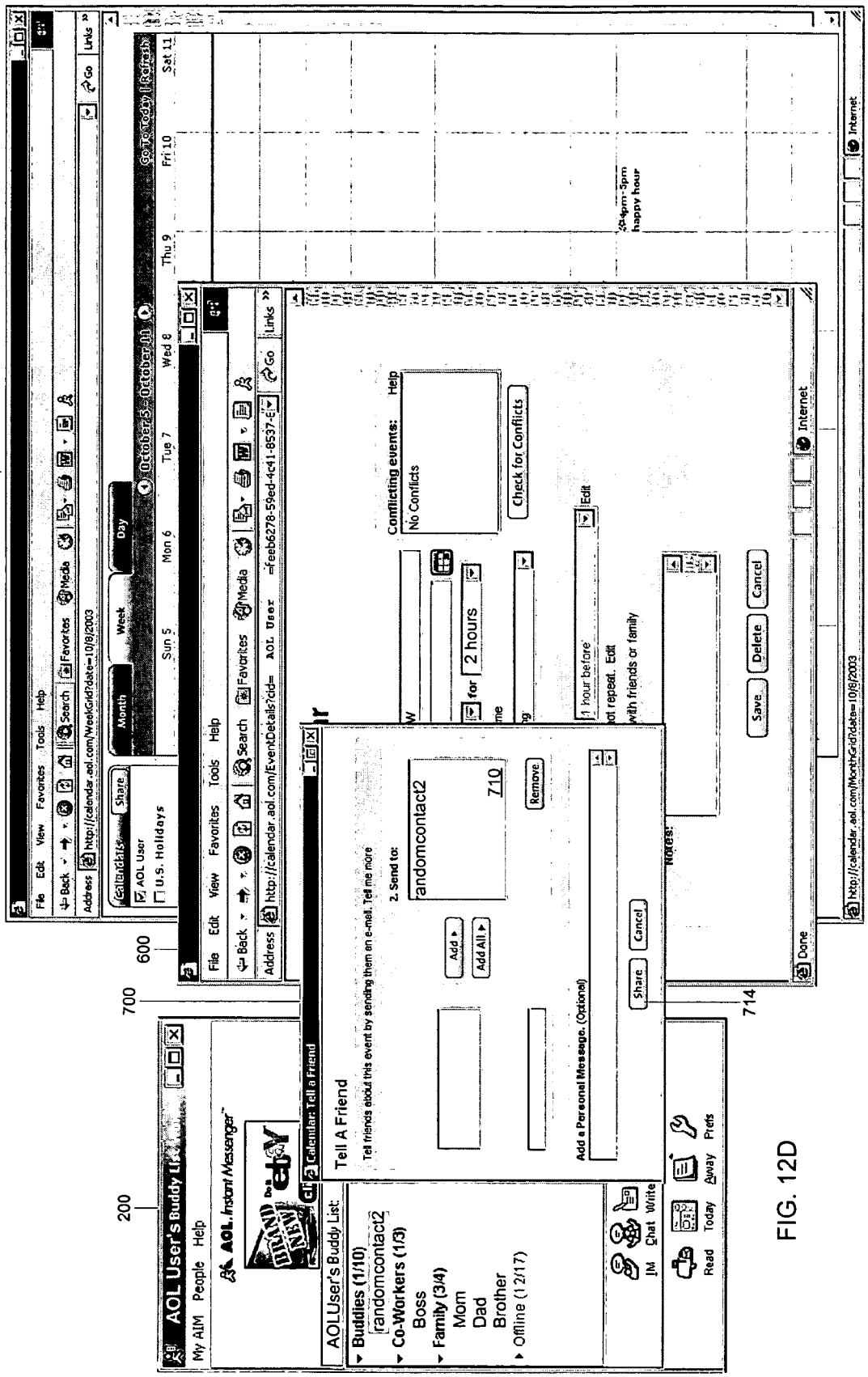

Referring to FIG. 12D, by dropping the event 302a onto the screen name 204a, the screen name 204a has been entered automatically in the selected invitee list 710 of the invitation tool 700 that is displayed along with the event specification tool 600 for the calendar event 302a. An invitation to the event 302a may be sent to randomcontact2 through selection of the share button 714, which sends an invitation in an instant message.

Figure 12E:
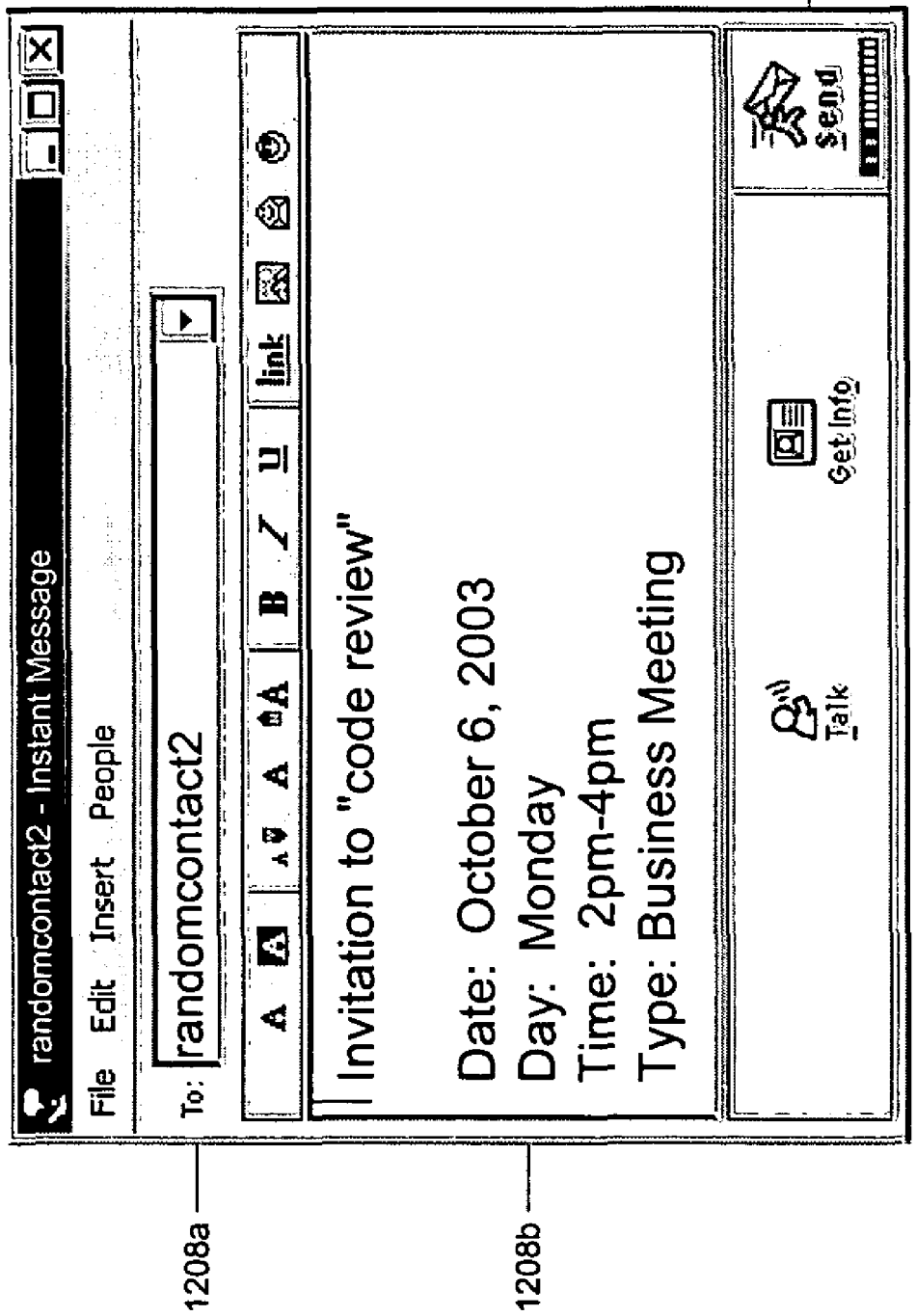

Referring to FIG. 12E, one implementation of an instant message 1208 is shown, such as might be sent through selection of the share button 714. The instant message 1208 includes a "To" field 1208a indicating that the instant message is for randomcontact2, a body field 1208b including a description of the calendar event, and a send button 1208c. Selecting the send button 1208c sends the description of the calendar event in the body field 1208b to the recipient(s) of the instant message specified in the "To" field 1208a. In another implementation, the instant message 1208 may not be shown, and the instant message inviting randomcontact2 to the event may be sent automatically and transparently after the share button 714 has been selected.

Figure 12F:
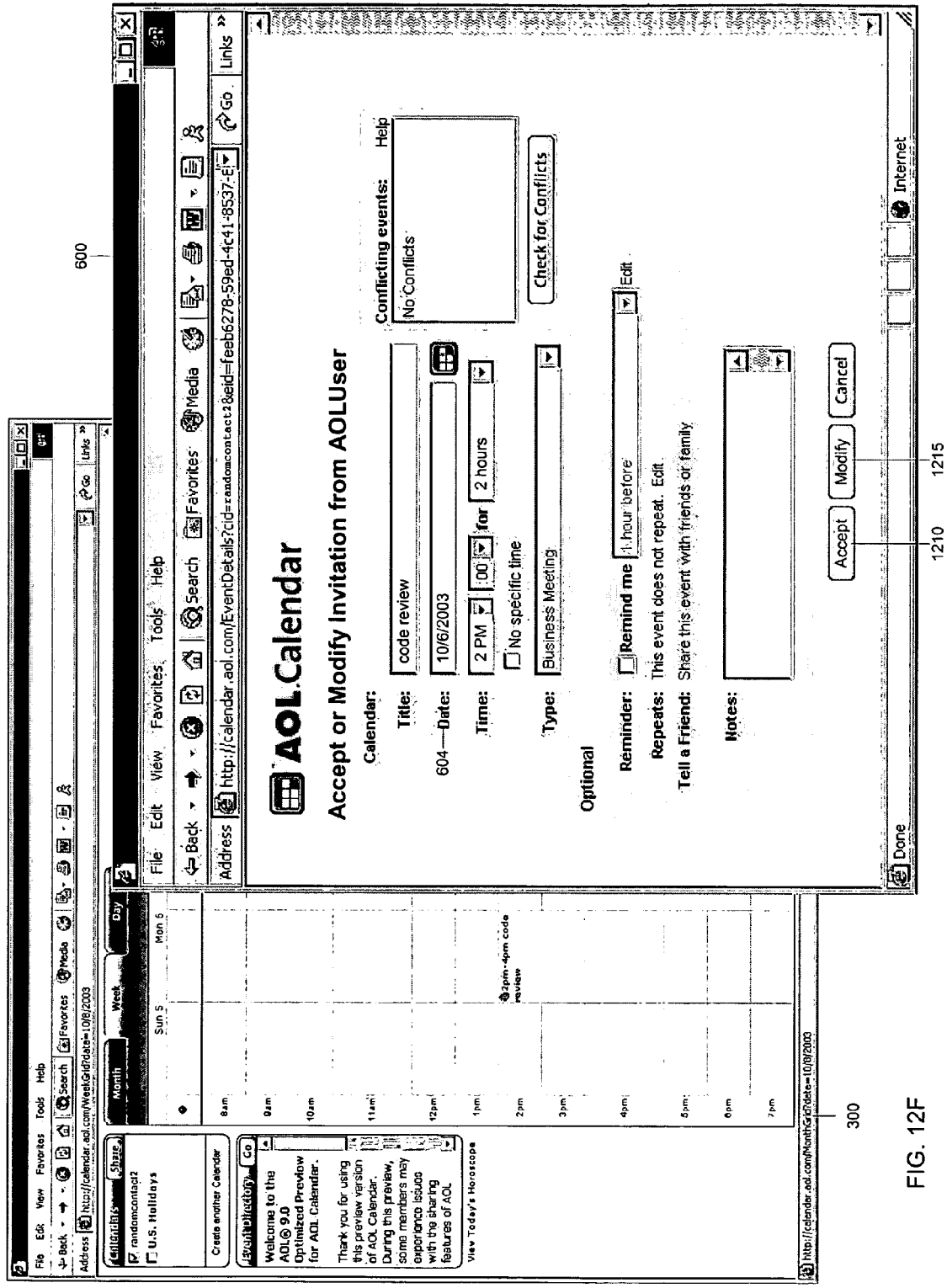

Referring to FIG. 12F, the instant message 1208 has been received and the event specification tool 600 has been opened for the proposed event to which randomcontact2 has been invited.

The event specification tool 600 may be opened automatically by, for example, the IM system for randomcontact2 (i) recognizing that the received IM 1208 is an invitation to a calendar event, and (ii) causing a calendar application to open and display the event data in the tool 600. The event specification tool may be opened manually by, for example, the user randomcontact2 reading the received IM 1208 and selecting an embedded command that causes the tool 600 to open.

The event specification tool 600 may include an accept button 1210, the selection of which includes the event 302a in the electronic calendar interface 300 for randomcontact2. The electronic calendar interface 300 for randomcontact2 is shown in the background with the event 302a included, such as would occur after selecting the accept button 1210. Randomcontact2 also may modify the details of the event specified in the event specification tool 600 by directly changing the entries displayed. Such changes may be based on, for example, conflicts with other events. For example, randomcontact2 may change the date of the event specified in the date text field 604. After making the desired changes to the event, randomcontact2 may notify AOL User, who originally proposed the event, of the changes through selection of a modify button 1215. Selecting the modify button 1215 sends an instant message to AOL User describing the changes made by randomcontact2 to the proposed event. For example, randomcontact2 may propose a date change for the event 302a from Oct. 6, 2003 to Oct. 7, 2003 by modifying the date text field 604 and selecting the modify button 1215. An IM would be sent back to AOL User to inform AOL user of the proposed date change.

Figure 12G:
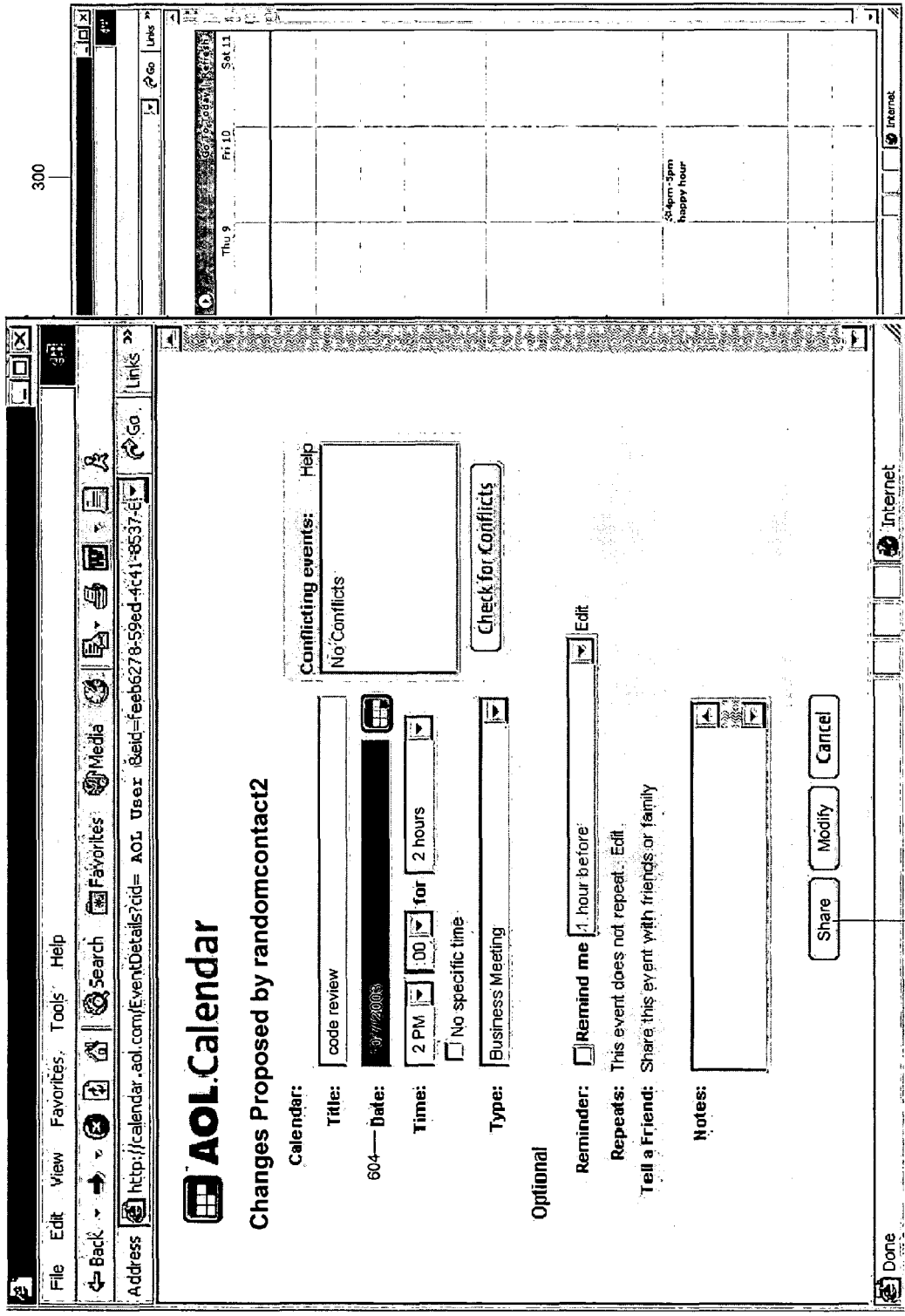

Referring to FIG. 12G the event specification tool 600 for AOL User is shown displaying the data for the event 302a and highlighting the changes proposed by randomcontact2. Note that the calendar interface 300 for AOL User is also displayed for the convenience of AOL User. The received instant message may, for example, cause the event specification tool 600 for AOL User to open automatically. The details of the event 302a may be further modified by AOL User with the event specification tool 600. Selecting a share button 1220 once again sends an updated invitation in an instant message to randomcontact2. In this manner, the event 302a may be modified until the details of the event 302a are agreed upon by AOL User and randomcontact2.

Figure 12H:
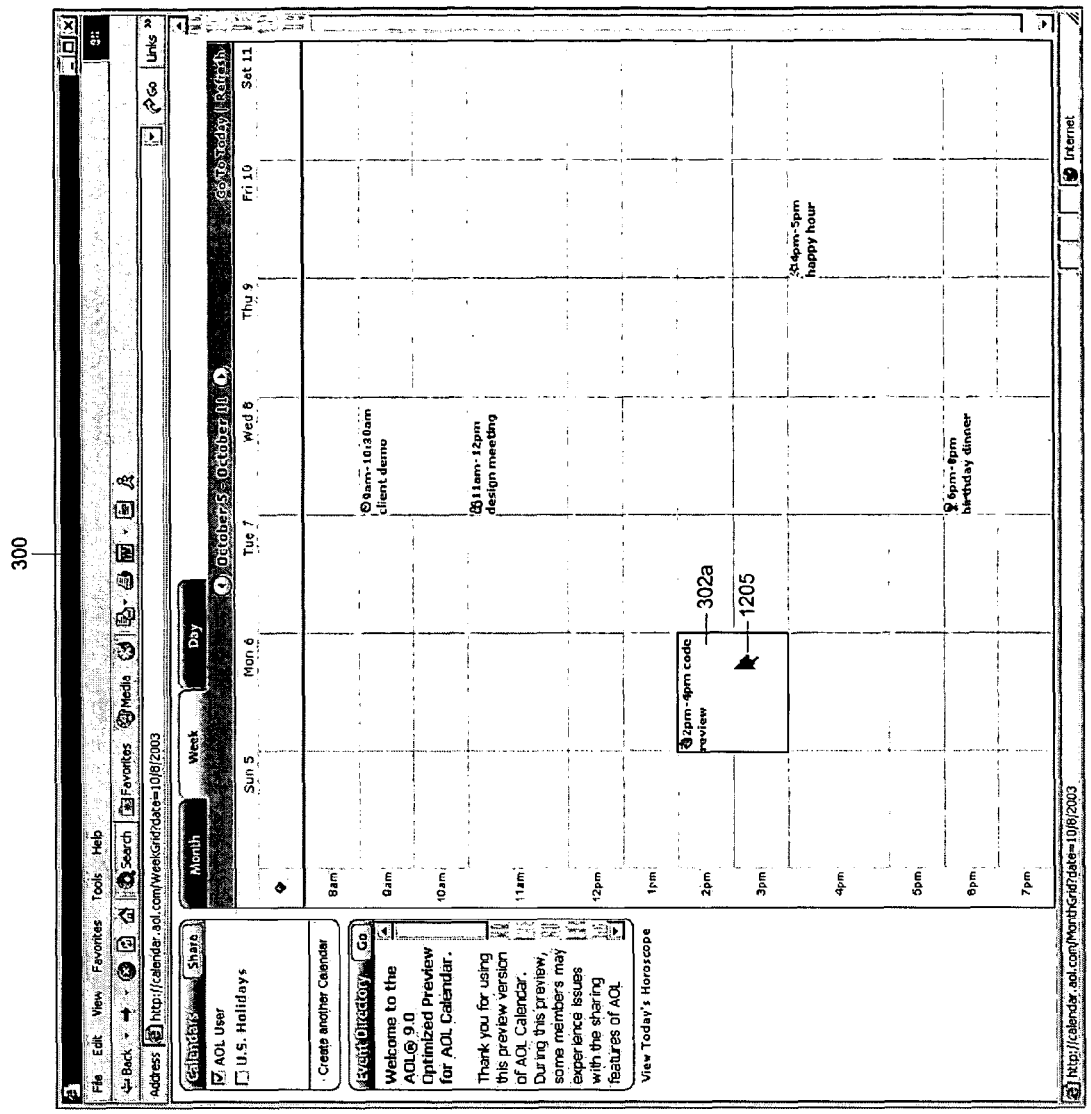
Figure 12H:
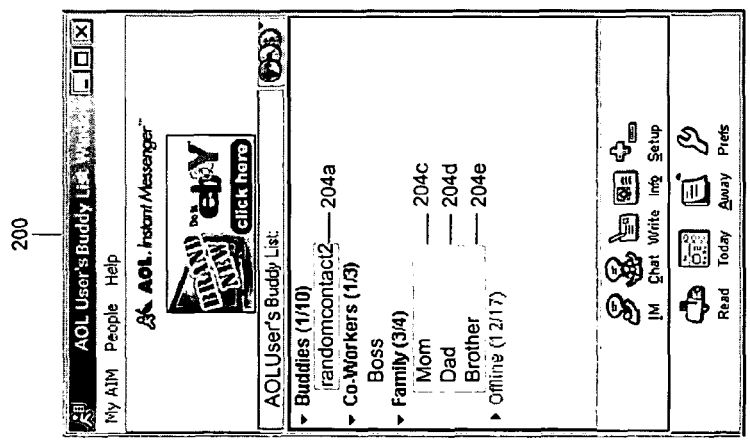

Referring to FIG. 12H, the user with the screen name "AOL User" may invite multiple invitees to an event. The user may select the event 302a in the calendar interface 300 and select multiple screen names in the buddy list interface 200. For example, in the buddy list interface 200, the screen names 204a ("randomcontact2"), 204c ("Mom"), 204d ("Dad"), and 204e ("Brother") have been selected.

Figure 12I:
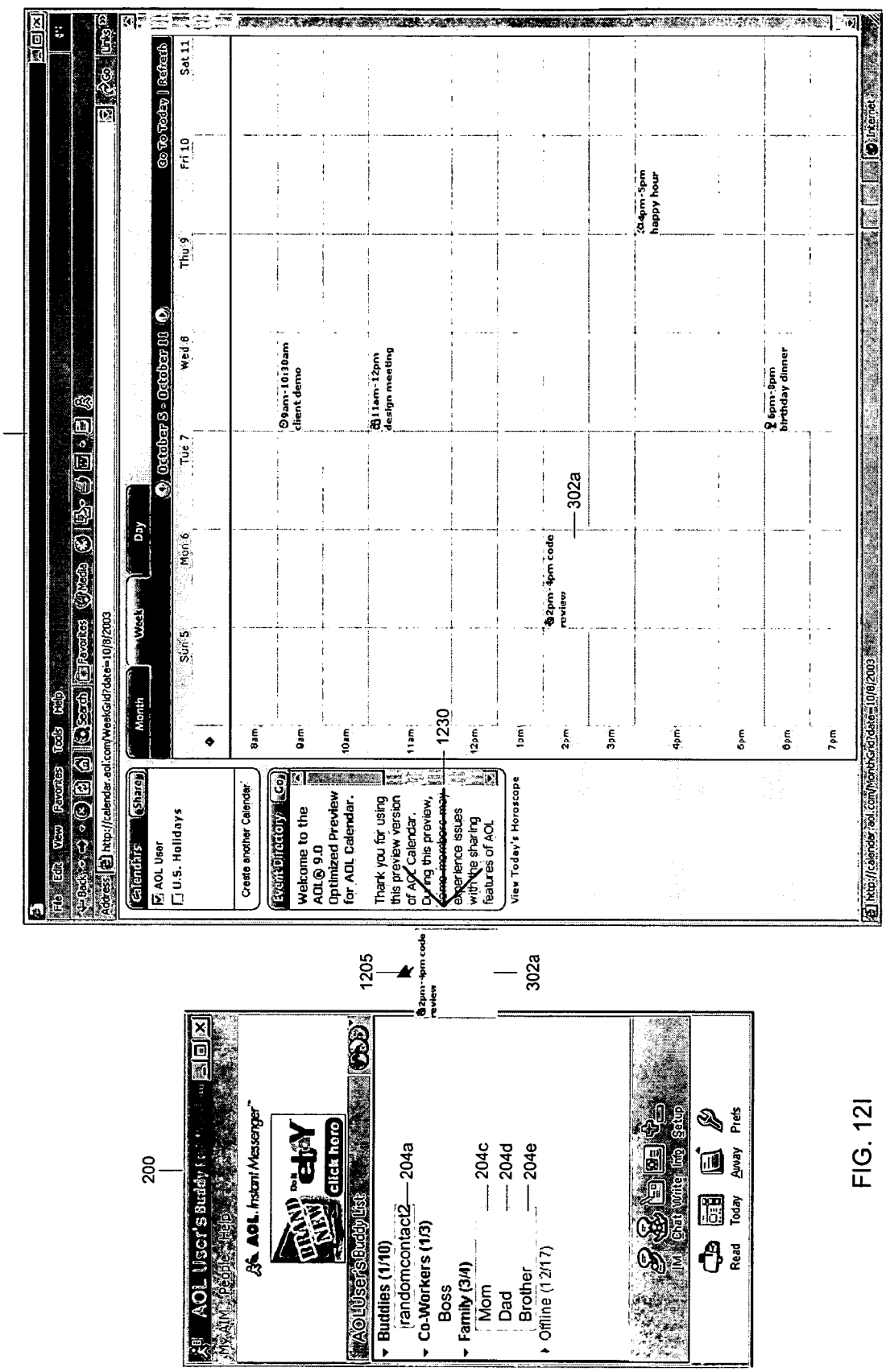
Figure 12J:
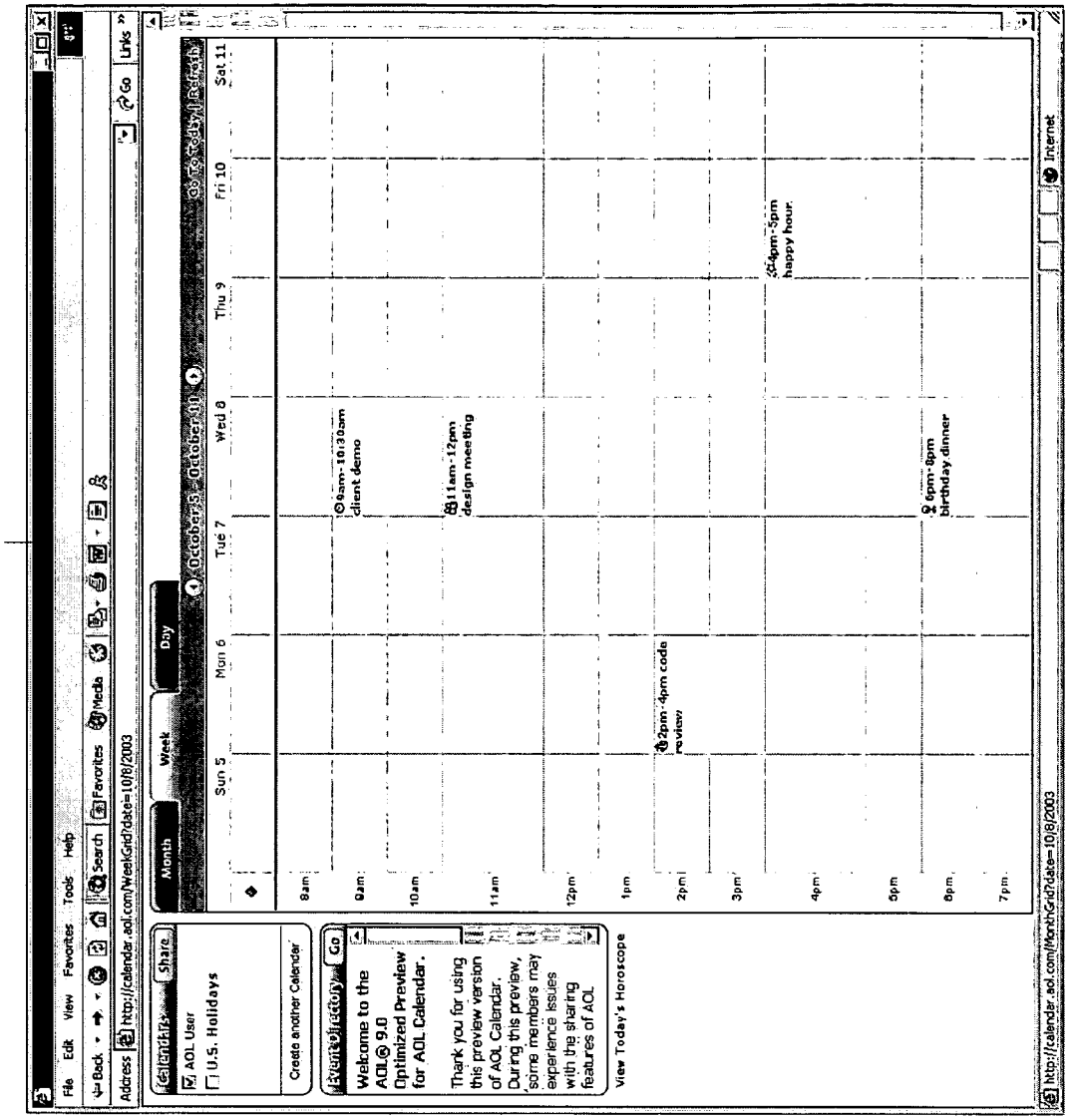
Figure 12J:
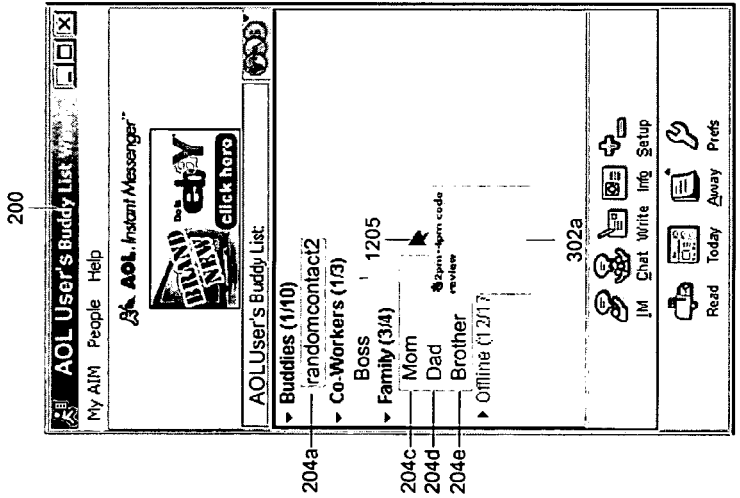

Referring to FIG. 12I, the user may then drag the event 302a towards the buddy list interface 200, where the screen names 204a and 204c-204e are selected, as indicated by an arrow 1230. Referring to FIG. 12J, the event 302a has been dragged from the electronic calendar interface 300 over one of the screen names 204a and 204c-204e in the buddy list interface 200, thereby selecting the screen names 204a and 204c-204e as invitees to the calendar event 302a.

Figure 12K:
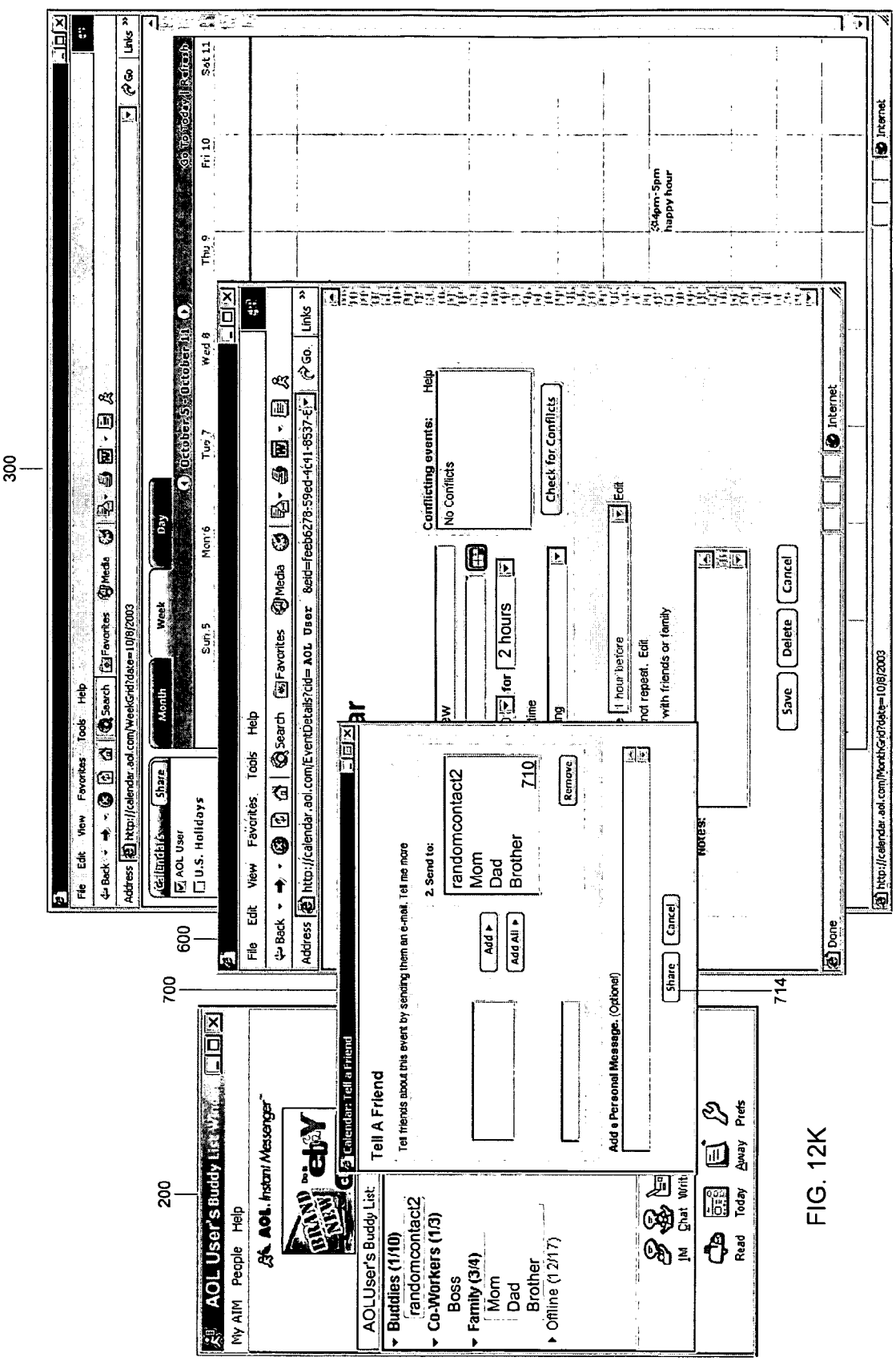

Referring to FIG. 12K, after dropping the dragged event 302a onto the buddy list interface 200, the screen names 204a and 204c-204e are entered automatically in the selected invitee list 710 of the invitation tool 700 that is displayed along with the event specification tool 600 for the calendar event 302a. The event may be shared with randomcontact2, Mom, Dad, and Brother through selection of the share button 714, which sends an invitation in a separate instant message to each of randomcontact2, Mom, Dad, and Brother.

Figure 12L:
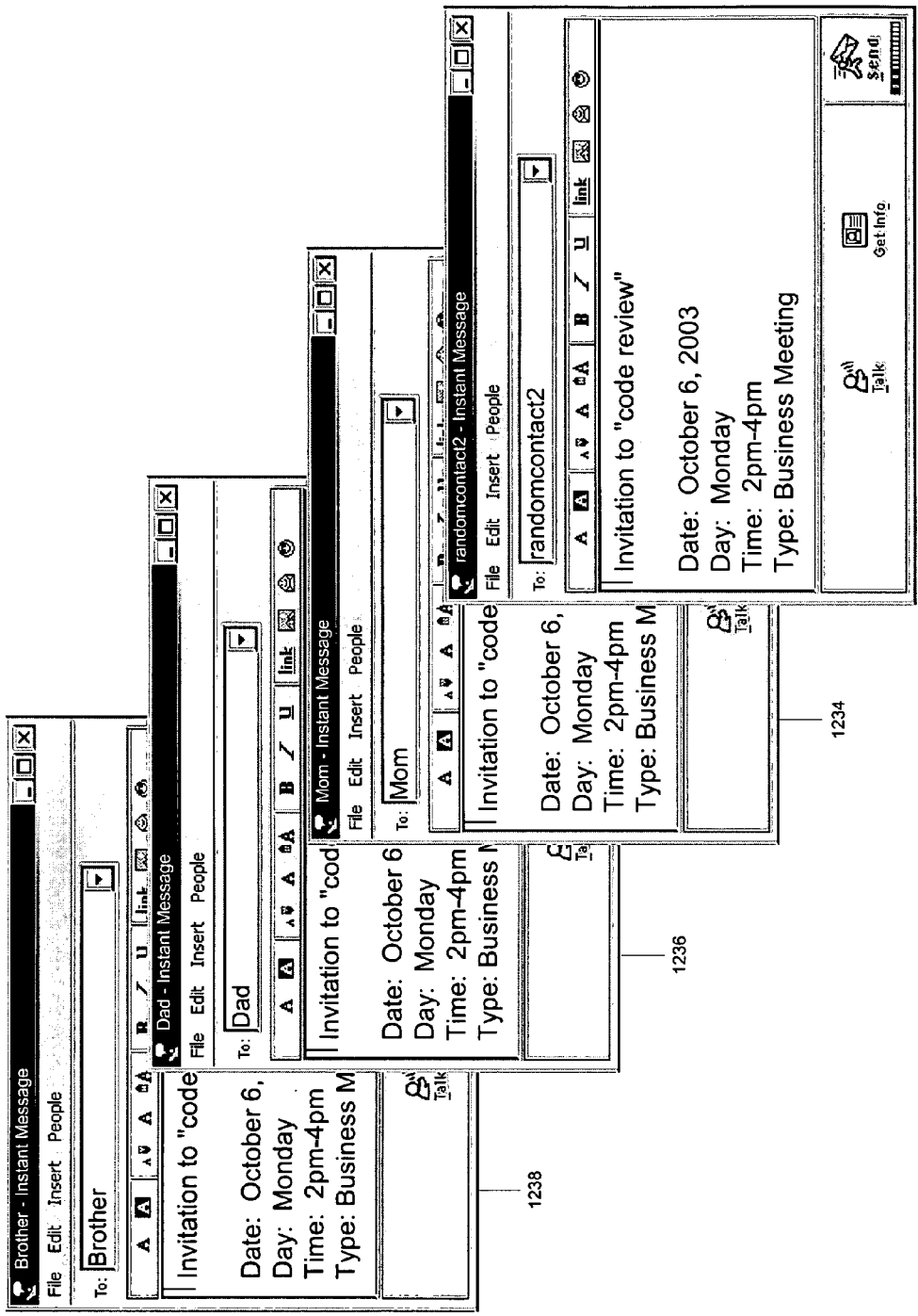

Referring to FIG. 12L, separate IMs 1232 1234, 1236, and 1238 are shown for each of randomcontact2, Mom, Dad, and Brother, respectively. These IMs 1232, 1234, 1236, and 1238 may, for example, be processed in a manner similar to IM 1208. In particular, each of randomcontact2, Mom, Dad, and Brother may make changes to the event as described above with respect to FIG. 12F, and AOL User may accept the changes and/or make further changes as described with respect to FIG. 12G. In another implementation, the instant messages 1230, 1232, 1234, and 1236 may not be shown, and the instant messages inviting randomcontact2, Mom, Dad, and Brother to the event may be sent automatically and transparently after the share button 714 has been selected. AOL User also may drag and drop the event 302a into a buddy group name, such as, for example, "Family," to invite multiple entities to the event 302a.

Figure 12M:
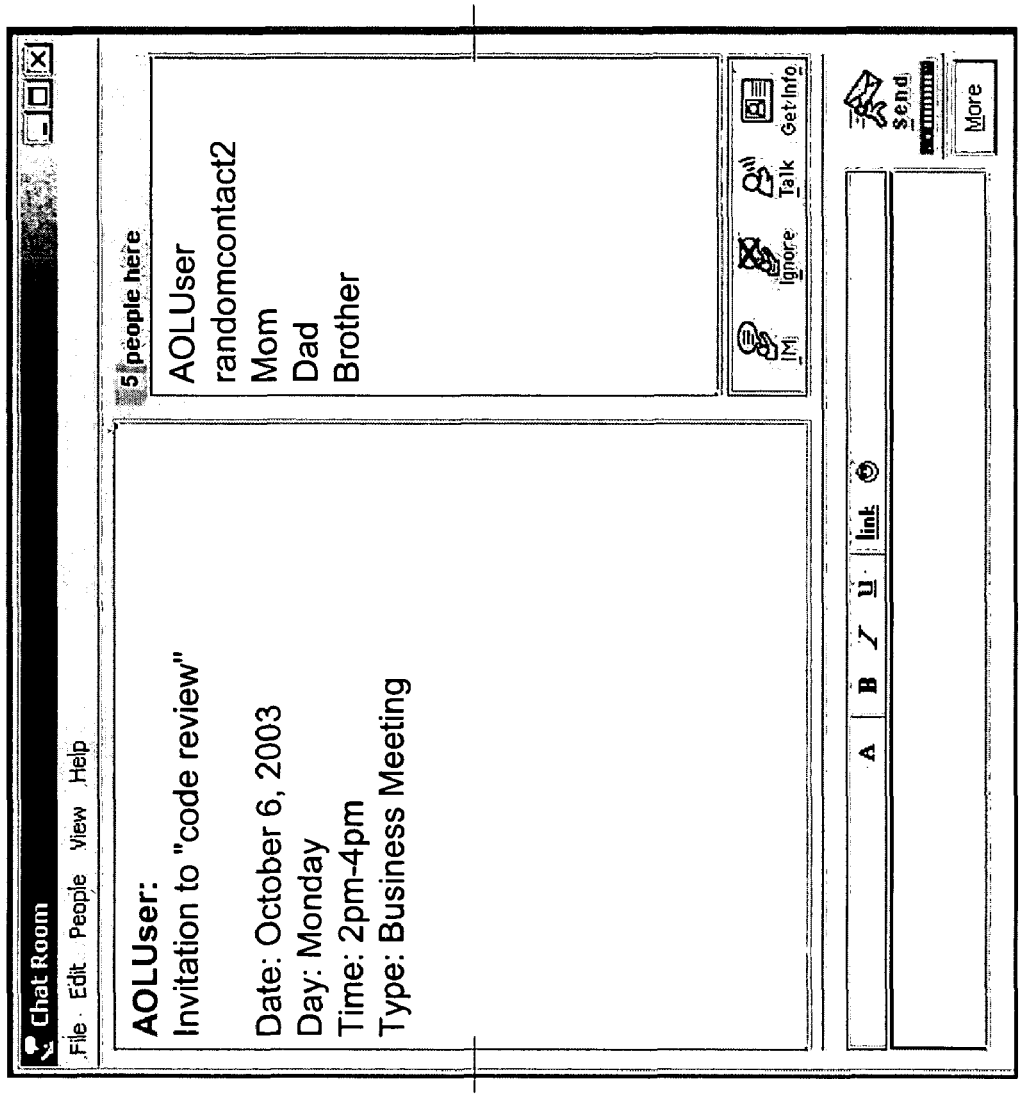

Referring to FIG. 12M, a buddy chat window 1240 enables simultaneous sending of an invitation to the selected event to the selected screen names. The invitor, AOLUser, may be given the option of using multiple instant messages, as was done with respect to FIG. 12L, or a single buddy chat window 1240 to invite the selected screen names to the selected event. A message sent with the buddy chat window 1240 may be seen by all screen names for which the buddy chat window 1240 is displayed. The screen names for which the buddy chat window 1240 is displayed are listed in the screen name list 1244. More particularly, the buddy chat window 1240 is displayed for each of AOLUser, randomcontact2, Mom, Dad, and Brother. The buddy chat window 1240 includes a message history box 1242 in which an invitation to the event is displayed. Each of AOLUser, randomcontact2, Mom, Dad, and Brother may process the invitation in a manner similar to IM 1208. In particular, each of randomcontact2, Mom, Dad, and Brother may make changes to the event as described above with respect to FIG. 12F. However, the proposed changes are received by all invitees to the event, as well as the invitor, with the buddy chat window 1240. Therefore, all of the invitees and the invitor are presented with the changes and may accept the changes or make further changes to the event. When a buddy chat window 1240 is used, the modification process is more collaborative and the burden of receiving and accepting changes does not fall solely on the invitor, AOLUser A number of implementations have been described. Nevertheless, it will be understood that various modifications may be made without departing from the spirit and scope of the invention. For example, referring again to FIG. 1, each of the client systems 110 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 110 may receive instructions from, for example, a software application, a program, a piece of code, a device, a computer, a computer system, or a combination thereof, which independently or collectively direct operations, as described herein. These instructions may take the form of one or more communications programs that facilitate communications between the users of the client systems 110. For instance, such communications programs may include e-mail programs, IM programs, file transfer protocol (FTP) programs, and voice over internet protocol (VoIP) programs. The instructions may be embodied permanently or temporarily in a machine, a component, a piece of equipment, a storage medium, or a propagated signal that is capable of being delivered to the client systems 110.

The client systems 110 include a communications interface (not shown) used by the communications programs to send communications through the network 120. The communications may include, for example, e-mail, audio data, video data, general binary data, or text data (e.g., encoded in American Standard Code for Information Interchange (ASCII) format). The client systems 110 also include one or more input devices, such as a keyboard, mouse, stylus, or microphone, as well as one or more output devices, such as a monitor, touch screen, speakers, or a printer.

The network 120 typically includes a series of portals interconnected through a coherent system. Examples of the network 120 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (xDSL)), or any other wired or wireless network. The network 120 may include multiple networks or subnetworks, each of which may include, for example, a wired or wireless data pathway.

As with the client systems 110, the host server 130 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The host server 130 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include e-mail programs, IM programs, FTP programs, VoIP programs, etc. The instructions may be embodied permanently or temporarily in a machine, a component, a piece of equipment, a storage medium, or a propagated signal that is capable of being delivered to the host server 130.

Further, the host server 130 includes a communications interface (not shown) used by the communications programs to send communications through the network 120. The communications may include, for example, e-mail, audio data, video data, general binary data, or text data (e.g., ASCII format).

Other implementations allow a user to create a calendar event with selected entities as invitees by a feature that is associated with, for example, IM screen names. For example, a user may right-click on a screen name to provide access to a "create event" feature that creates and opens a calendar event with the screen name inserted as an invitee. Further, multiple screen names may be selected using, for example, <shift> click or <control> click, and a right-click on the selected set may provide access to a "create event" feature that creates and opens a calendar event with each of the selected screen names inserted as invitees.

Although various aspects are above described with respect to a calendar application, electronic content from a different application may be shared through an IM system. For example, electronic content from a word processing program, a graphics program, or an audio or video-editing program may be shared with multiple people through the IM system. The electronic content is shared with the multiple people by simultaneously sending an instant message including the electronic content to each of the multiple people.

Throughout the description, a buddy list of an IM system is used to indicate a contact list that includes potential invitees to calendar events. In various implementations, invitees to a calendar event are selected from the buddy list, and instant messages are used to send invitations to the calendar event to the invitees. However, other contact lists may include potential invitees to calendar events, and the other contact lists may be used to send invitations to the invitees. For example, an e-mail address book may be used to select potential invitees, and e-mail messages may be used to send invitations to the invitees. In addition, a list of participants within a chat room/application may be used to select potential invitees, and chat may be used to distribute the invitations. The potential invitees included in the other contact lists may be organized into groups that may be manipulated in a manner such as described above with respect to groups of a buddy list.

The functional blocks, operations, and other disclosed features may be combined and performed in different orders and combinations, and may be repeated, omitted, and/or augmented with other features not explicitly disclosed.

Various implementations perform, for example, one or more operations, functions, or features automatically. "Automatically" refers to being performed substantially without human intervention, that is, in a substantially non-interactive manner. An example of an automatic process is a process that is started in response to a triggering event or in response to some action by a human operator which thereafter runs by itself.

Accordingly, other implementations are within the scope of the following claims.

What is claimed is:

1. A method for extending electronic invitations to a calendar event, comprising:

enabling access to a buddy list user interface that displays user-identified online identities and real time presence information for at least some of those online identities;

receiving, from a user through interaction with the buddy list user interface, a selection of multiple of the user-identified online entities from among the displayed user-identified online identities, the selected multiple user identified online identities being selected by the user as participants to whom invitations will be extended for the calendar event;

in response to the selection of the multiple user-identified online identities by the user, enabling the user to perceive a display that indicates the selection of the multiple user identified online identities and with which the user can interact to concurrently initiate communication of invitations to the selected participants whether or not the multiple user identified online identities are offline;

generating invitations to be communicated to the selected participants in response to interaction by the user with the display;

extending at least one of the invitations by sending an instant messaging communication;

detecting that a selected participant is presently offline;

storing an invitation to the event in an instant message delivery queue for the selected participant, the invitation to the event indicating a time at which the event will take place;

determining a time at which the selected participant comes online;

if the time at which the selected participant comes online is prior to the time at which the event will take place, delivering the invitation to the event as an instant message to the selected participant; and if the time at which the selected participant comes online is subsequent to the time at which the event will take place, removing the invitation to the event from the instant message delivery queue such that the invitation to the event is not delivered to the selected participant.

2. The method of claim 1 further comprising:
determining which of the selected participants are presently online; and
extending the invitations by sending instant messaging communications to the selected participants who are presently online.

3. The method of claim 2 wherein the invitations extended to the online participants via instant messaging are all sent at the same time.

4. The method of claim 2 wherein the invitations extended to multiple of the online participants via instant messaging are displayed to the invitor in a unified user interface.

5. The method of claim 4 wherein the invitations extended to multiple of the online participants via instant messaging are displayed to the invitor using a command line user interface that includes a single window listing communications from each of the multiple online participants.

6. The method of claim 2, wherein sending instant messaging communications comprises sending an instant message to one of the selected participants that is presently online, the instant message including message text and a link for display in an instant messaging user interface, the link being selectable by the selected participant to automatically add a calendar entry corresponding to the event to the calendar of the selected participant.

7. The method of claim 1 further comprising:
determining which of the selected participants are presently online;
establishing an instant messaging chat room; and
enabling the selected participants that are presently online to enter the instant messaging chat room to negotiate availability for participation in the calendar event.

8. The method of claim 7, wherein establishing an instant messaging chat room comprises establishing an instant messaging chat room that includes a text message for display to chat participants in the chat room that indicates a proposed time of day or a proposed date at which the event will take place.

9. The method of claim 1 further comprising:
determining that a selected participant is presently offline; and
extending an invitation to the selected participant who is determined to be presently offline using a communications program other than instant messaging.

10. The method of claim 9 wherein electronic mail is the communications program used to extend the invitation to the selected participant who is presently offline.

11. The method of claim 9 further comprising:
determining which of the selected participants are presently online;
using instant messages to extend invitations to the selected participants who are presently online; and
using electronic mail to extend invitations to the selected participants who are presently offline.

12. The method of claim 11, further comprising:
storing an alert indicating delivery of an e-mail invitation to the event in an instant message delivery queue for a selected participant that is presently offline;
determining whether the selected participant comes online prior to the selected participant accessing the e-mail invitation to the event;
if the selected participant comes online prior to the selected participant accessing the email invitation to the event, delivering the alert indicating delivery of the e-mail invitation to the selected participant; and
if the selected participant does not come online prior to the selected participant accessing the e-mail invitation to the event, removing the alert from the instant message delivery queue such that the alert is not delivered to the selected participant.

13. The method of claim 1 further comprising:
detecting that a selected participant is presently offline; and
providing the user with options to extend electronic invitations to offline participants an invitation using a communications program other than instant messaging.

14. The method of claim 13 wherein electronic mail is the communications program used to extend the invitation to the selected participant who is not presently online.

15. The method of claim 1 further comprising:
detecting that a selected participant is not presently online; and
extending an invitation to the selected participant using an instant message whose delivery will be delayed until the selected participant is again online.

16. The method of claim 1 wherein the presence information reflected for an online identity by the user-defined list reflects an availability of that online identity to receive instant messaging communications without delay.

17. The method of claim 1 wherein at least one participant selection is received in response to a user dragging a calendar event from a calendar application user interface to a position on a buddy list user interface corresponding to the participant.

18. The method of claim 1 wherein:
at least one participant selection is received in response to a user dragging a time block from a calendar application user interface to a position on a buddy list user interface corresponding to the participant; and
the at least one time parameter for the event is recognized by providing a calendar event input interface listing the participant as an invitee in response to the dragging of the time block.

19. The method of claim 1 wherein at least one participant selection is received in response to a user dragging a calendar event from a calendar application user interface to a position on a buddy list user interface corresponding to the participant.

20. The method of claim 1 wherein at least one participant selection is received in response to a user dragging a representation of an online identity from within their buddy list to a calendar application user interface.

21. The method of claim 1 wherein selection of multiple participants is received in response to a user dragging a representation of a group of multiple online identities from within their buddy list to a calendar application user interface.

22. The method of claim 1, wherein receiving, from the user through interaction with the buddy list interface, the selection of the multiple user-identified online identities comprises receiving, from the user through interaction with the buddy list interface, a selection of a buddy group identifier displayed to the user in the buddy list interface, the buddy group identifier identifying a group of user-identified online identities.

23. The method of claim 22, further comprising enabling the buddy group identifier to be visually distinguished from other of the displayed user-identified online identities to indicate selection by the user in response to selection of the buddy group identifier by the user.

24. The method of claim 1, wherein, receiving, from the user through interaction with the buddy list interface, the selection of the multiple user-identified online identities comprises receiving, from the user through interaction with the buddy list interface, a selection of a first online identity displayed to the user in the buddy list interface and a selection of a second online identity displayed to the user in the buddy list interface while the first online identity remains selected by the user.

25. The method of claim 24, further comprising enabling the first online identity to be visually distinguished from other of the displayed user-identified online identities to indicate selection by the user in response to selection of the first online identity by the user and enabling the second online identity to be similarly visually distinguished from the other of the displayed user-identified online identities to indicate selection by the user in response to selection of the second online identity by the user while the first online identity remains visually distinguished.

26. The method of claim 1, wherein enabling the user to perceive a display with which the user can interact to concurrently initiate communication of invitations to the selected participants comprises enabling the user to perceive a display that includes a graphical element selectable by the user to initiate, at the same time, communication of invitations to all of the selected participants.

27. The method of claim 26, wherein the graphical element comprises a graphical button selectable by the user to initiate communication of invitations to the selected participants.

28. The method of claim 26, further comprising delivering the invitations to the selected participants at the same time in response to and subsequent to the user selecting the graphical element.

29. The method of claim 26, further comprising delivering the invitations to the selected participants at different times in response to and subsequent to the user selecting the graphical element.

30. The method of claim 1, wherein enabling the user to perceive the display comprises enabling the user to perceive a display that lists the selected user identified online identities and that includes a graphical element selectable by the user to initiate communication of invitations to the selected participants.

31. The method of claim 1, further comprising delivering the invitations to the selected participants at the same time in response to and subsequent to the user interacting with the display to initiate the communications.

32. The method of claim 1, further comprising delivering the invitations to the selected participants at different times in response to and subsequent to the user interacting with the display to initiate the communications.

33. The method of claim 1, wherein receiving, from the user through interaction with the buddy list user interface, the selection of multiple of the user-identified online identities comprises receiving a selection from the user that includes a first online identity that is presently offline and a second online identity that is presently online.

34. The method of claim 1, wherein generating invitations to be communicated to the selected participants comprises
generating invitations that indicate to a recipient of the invitation a proposed time when the user wants the event to take place, and further comprising
receiving a response to one of the generated invitations from one of the selected participants, the response proposing a new time for when the selected participant wants the event to take place, the new time being different from the proposed time.

35. The method of claim 34, wherein the proposed time includes a proposed time of day and a proposed date.

36. A computer system capable of extending electronic invitations to a calendar event, comprising:
one or more processors executing the following modules;
an access module configured to enable access to a buddy list user interface that displays user-identified online identities and real time presence information for at least some of those online identities;
a selection module configured to receive, from a user through interaction with the buddy list interface, a selection of multiple of the user-identified online identities from among the displayed user-identified online identities, the selected multiple user identified online identities being selected by the user as participants to whom invitations will be extended for the calendar event;
a display module configured to, in response to the selection of the multiple user-identified online identities by the user, enable the user to perceive a display that indicates the selection of the multiple user-identified online identities and with which the user can interact to concurrently initiate communication of invitations to the selected participants whether or not the multiple user identified online identities are offline;
an invitation module configured to generate invitations to be communicated to the selected participants in response to interaction by the user with the display;
a communications module configured to extend at least one of the invitations by sending an instant messaging communication; and
one or more modules configured to:
detect that a selected participant is presently offline;
store an invitation to the event in the invitation module in an instant message delivery queue for the selected participant, the invitation to the event indicating a time at which the event will take place;
determine a time at which the selected participant comes online;
if the time at which the selected participant comes online is prior to the time at which the event will take place, deliver the invitation as an instant message to the selected participant; and
if the time at which the selected participant comes online is subsequent to the time at which the event will take place, remove the invitation to the event from the instant message delivery queue such that the invitation to the event is not delivered to the selected participant.

37. The computer system of claim 36 further comprising:
a presence module configured to determine which of the selected participants are presently online; and
a second communications module configured to extend the invitations by sending instant messaging communications to the selected participants who are presently online.

38. The computer system of claim 37 wherein the invitations extended to the online participants via instant messaging are all sent at the same time.

39. The computer system of claim 37 wherein the invitations extended to multiple of the online participants via instant messaging are displayed to the invitor in a unified user interface.

40. The computer system of claim 39 wherein the invitations extended to multiple of the online participants via instant messaging are displayed to the invitor using a command line user interface that includes a single window listing communications from each of the multiple online participants.

41. The computer system of claim 36 further comprising:
a presence module configured to determine which of the selected participants are presently online; and
a chat module configured to:
establish an instant messaging chat room; and
enable the selected participants that are presently online to enter the instant messaging chat room to negotiate availability for participation in the calendar event.

42. The computer system of claim 41 wherein the chat module is configured to establish an instant messaging chat room that includes a text message for display to chat participants in the chat room that indicates a proposed time of day or a proposed date at which the event will take place.

43. The computer system of claim 36 further comprising:
a presence module configured to determine that a selected participant is presently offline; and
a second communications module configured to extend an invitation to the selected participant who is determined to be presently offline using a communications program other than instant messaging.

44. The computer system of claim 43 wherein electronic mail is the communications program used to extend the invitation to the selected participant who is presently offline.

45. The computer system of claim 43 further comprising:
a second presence module configured to determine which of the selected participants are presently online;
an instant messaging module configured to use instant messages to extend invitations to the selected participants who are presently online; and
an electronic mail module configured to use electronic mail to extend invitations to the selected participants who are presently offline.

46. The computer system of claim 36 further comprising:
a presence module configured to detect that a selected participant is presently offline; and
a preferences module configured to provide the user with options to extend electronic invitations to offline participants an invitation using a communications program other than instant messaging.

47. The computer system of claim 46 wherein electronic mail is the communications program used to extend the invitation to the selected participant who is not presently online.

48. The computer system of claim 36 further comprising:
a presence module configured to detect that a selected participant is not presently online; and
a second communications module configured to extend an invitation to the selected participant using an instant message whose delivery will be delayed until the selected participant is again online.

49. The computer system of claim 36 wherein the presence information reflected for an online identity by the user-defined list reflects an availability of that online identity to receive instant messaging communications without delay.

50. The computer system of claim 36 wherein at least one participant selection is received in response to a user dragging a calendar event from a calendar application user interface to a position on a buddy list user interface corresponding to the participant.

51. The computer system of claim 36 wherein:
at least one participant selection is received in response to a user dragging a time block from a calendar application user interface to a position on a buddy list user interface corresponding to the participant; and
the at least one time parameter for the event is recognized by providing a calendar event input interface listing the participant as an invitee in response to the dragging of the time block.

52. The computer system of claim 36 wherein at least one participant selection is received in response to a user dragging a calendar event from a calendar application user interface to a position on a buddy list user interface corresponding to the participant.

53. The computer system of claim 36 wherein at least one participant selection is received in response to a user dragging a representation of an online identity from within their buddy list to a calendar application user interface.

54. The computer system of claim 36 wherein selection of multiple participants is received in response to a user dragging a representation of a group of multiple online identities from within their buddy list to a calendar application user interface.

55. An apparatus for extending electronic invitations to a calendar event, comprising:
access means for enabling access to a buddy list user interface that displays user-identified online identities and real time presence information for at least some of those online identities;
selection means for receiving, from a user through interaction with the buddy list user interface, a selection of multiple of the user-identified online identities from among the displayed user-identified online identities, the selected multiple user identified online identities being selected by the user as participants to whom invitations will be extended for the calendar event;
display means for in response to the selection of the multiple user-identified online identities by the user, enabling the user to perceive a display that indicates the selection of the multiple user-identified online identities and with which the user can interact to concurrently initiate communication of invitations to the selected participants whether or not the multiple user identified online identities are offline;
invitation means for generating invitations to be communicated to the selected participants in response to interaction by the user with the display; and
communications means for extending at least one of the invitations by sending an instant messaging communication detecting means for detecting that a selected participant is presently offline;

storing means for storing an invitation to the event in an instant message delivery queue for the selected participant, the invitation to the event indicating a time at which the event will take place;

means for determining a time at which the selected participant comes online;

means for delivering the invitation as an instant message to the selected participant if the time at which the selected participant comes online is prior to the time at which the event will take place; and means for removing the invitation to the event from the instant message delivery queue such that the invitation to the event is not delivered to the selected participant if the time at which the selected participant comes online is subsequent to the time at which the event will take place.

* * * * *